United States Patent
Esterle et al.

(10) Patent No.: US 9,797,499 B2
(45) Date of Patent: Oct. 24, 2017

(54) METHOD OF INSTALLING A MOTOR ON A GEAR BOX

(71) Applicant: Baldor Electric Company, Fort Smith, AR (US)

(72) Inventors: Thomas F. Esterle, Greenville, SC (US); Michael E. Konruff, Simpsonville, SC (US); Chuong Nguyen, Simpsonville, SC (US); Charles Richard Russell, Greenville, SC (US); Jack Dean Asher, Greenville, SC (US)

(73) Assignee: Baldor Electric Company, Fort Smith, AR (US)

( * ) Notice: Subject to any disclaimer, the term of this patent is extended or adjusted under 35 U.S.C. 154(b) by 502 days.

(21) Appl. No.: 14/457,649

(22) Filed: Aug. 12, 2014

(65) Prior Publication Data

US 2016/0047458 A1   Feb. 18, 2016

(51) Int. Cl.
*F16H 57/025*      (2012.01)
*F16H 57/00*       (2012.01)
(Continued)

(52) U.S. Cl.
CPC .............. *F16H 57/025* (2013.01); *B60K 1/00* (2013.01); *F16H 2057/0056* (2013.01);
(Continued)

(58) Field of Classification Search
CPC .......... F16H 2057/0062; F16H 57/025; F16H 2057/02069; F16H 2057/02034; F16H 2057/0056; B60K 1/00; Y10T 29/49895
See application file for complete search history.

(56) References Cited

U.S. PATENT DOCUMENTS 1,299,156 A    4/1919   Fast
2,277,738 A    3/1942   Wilkinson
(Continued)

FOREIGN PATENT DOCUMENTS

EP        0164968 A1    12/1985

OTHER PUBLICATIONS

Co-Pending U.S. Appl. No. 14/333,667, filed Jul. 17, 2014, Inventors: Konruff, M.; Russell, C.; Nguyen, C., (Not Yet Published).
(Continued)

*Primary Examiner* — Sarang Afzali
*Assistant Examiner* — Ruth G Hidalgo-Hernandez
(74) *Attorney, Agent, or Firm* — Thompson Coburn LLP

(57) ABSTRACT

A method of mounting a motor to a gearbox includes positioning a coupling along an input shaft of the gearbox from a starting position to a first alignment position. In the starting position, the coupling drivingly engages a greater portion of the gearbox input shaft than in the first alignment position. In the first alignment position, the coupling operatively contacts the motor output shaft. Another step includes rotating the coupling so that the coupling aligns with the motor output shaft. Another step includes axially positioning the coupling at a second alignment position such that the coupling drivingly engages both the motor output and the gearbox input shafts. Another step includes positioning the motor to allow mounting of the motor on the gearbox with the coupling at a third alignment position drivingly engaging a greater portion of the motor output and the gearbox input shafts than in the second alignment position.

26 Claims, 19 Drawing Sheets

(51) Int. Cl.
    *F16H 57/02*         (2012.01)
    *B60K 1/00*         (2006.01)
    *F16H 57/022*       (2012.01)

(52) U.S. Cl.
    CPC ............... *F16H 2057/0062* (2013.01); *F16H 2057/0225* (2013.01); *F16H 2057/02026* (2013.01); *F16H 2057/02034* (2013.01); *F16H 2057/02069* (2013.01); *Y10T 29/49895* (2015.01)

(56) References Cited

U.S. PATENT DOCUMENTS

| | | | |
|---|---|---|---|
| 2,472,559 A | 6/1949 | Arnold | |
| 3,223,197 A | 12/1965 | Conover | |
| 3,321,999 A | 5/1967 | Greer | |
| 3,575,531 A * | 4/1971 | Buckingham | B01F 15/00448 416/170 R |
| 3,765,636 A | 10/1973 | Burrell et al. | |
| 3,959,990 A * | 6/1976 | Golitz | F16H 57/025 464/137 |
| 4,324,213 A | 4/1982 | Kasting et al. | |
| 4,590,820 A | 5/1986 | Hambric | |
| 4,607,730 A | 8/1986 | Paisley | |
| 4,655,326 A | 4/1987 | Osenbaugh | |
| 4,738,111 A | 4/1988 | Edwards | |
| 4,957,187 A | 9/1990 | Burgess | |
| 5,004,535 A | 4/1991 | Bosko et al. | |
| 5,092,553 A | 3/1992 | Joosse et al. | |
| 5,125,376 A | 6/1992 | Williams et al. | |
| 5,446,326 A | 8/1995 | Scheider | |
| 5,567,306 A | 10/1996 | DeWachter | |
| 5,771,854 A | 6/1998 | Barton | |
| 5,967,929 A | 10/1999 | Matsuoka et al. | |
| 6,035,515 A * | 3/2000 | Baer | B23P 19/00 29/505 |
| 6,202,814 B1 | 3/2001 | Braford, Jr. | |
| 6,834,634 B2 | 12/2004 | Lawrence | |
| 7,513,172 B2 | 4/2009 | Takahashi et al. | |
| 7,966,979 B2 | 6/2011 | Olsen et al. | |
| 8,025,601 B2 | 9/2011 | Iwasaki et al. | |
| 8,267,826 B2 | 9/2012 | Duong et al. | |
| 8,562,480 B1 | 10/2013 | Mellet et al. | |
| 8,601,997 B2 | 12/2013 | Cockerill et al. | |
| 8,702,373 B1 | 4/2014 | Valva et al. | |
| 9,222,383 B2 | 12/2015 | Togo | |
| 2007/0034458 A1 | 2/2007 | Rogers | |
| 2007/0197339 A1 | 8/2007 | Ryymin et al. | |
| 2009/0159038 A1 | 6/2009 | Koyama et al. | |
| 2009/0179387 A1 | 7/2009 | Saenz De Ugarte et al. | |
| 2010/0179011 A1 | 7/2010 | Demtroder et al. | |
| 2010/0304912 A1 | 12/2010 | Sime | |
| 2012/0108380 A1 | 5/2012 | Dinter et al. | |
| 2013/0035190 A1 | 2/2013 | McCune | |
| 2013/0095974 A1 | 4/2013 | Imai et al. | |
| 2013/0319006 A1 | 12/2013 | Parnin et al. | |
| 2014/0041619 A1 | 2/2014 | Yamauchi | |

OTHER PUBLICATIONS

Co-Pending U.S. Appl. No. 14/333,703, filed Jul. 17, 2014, Inventors: Konruff, M.; Nguyen, C., (Not Yet Published).
Co-Pending U.S. Appl. No. 14/477,166, filed Sep. 4. 2014, Inventors: Konruff, M.; Nguyen, C.; Russell, C.; Asher, J.; Dejong, J.; Esterle, T., (Not Yet Published).
Co-Pending U.S. Appl. No. 14/453,034, filed Aug. 6, 2014, Inventors: Konruff, M. (Not Yet Published).
Co-Pending U.S. Appl. No. 29/500,903, filed Aug. 29 2014, Inventors: Nguyen, C., (Not Yet Published).

* cited by examiner

METHOD OF INSTALLING A MOTOR ON A GEAR BOX

SUMMARY

This disclosure relates to a method of installing a motor on a gear box. In one aspect, the method relates to installation of a motor on a gear box in a vertical configuration, for instance, a vertical gear motor. Often times, a motor in a vertical gear motor application is physically large and difficult to manipulate. For instance, in one type of vertical gear motor application, a motor, for instance, an AC induction or synchronous motor, may be directly mounted to the gear box and connected to the gear train in the housing with a flexible coupling. Accurate alignment of the motor with the coupling and the gear box is desirable. The methods described herein allow for alignment of the motor with the gear box and alignment of the coupling between the motor output shaft and the gear box input shaft.

DETAILED DESCRIPTION

Although the drawings show and the description that follows relate to a housing that contains a planetary gear system, the disclosure is not limited to such housings or gear systems, and the techniques described herein may be applied to other housing configurations and types of gear trains. Additionally, while the drawings show and the description that follows relate to a motor mounted vertically above a gear box, the disclosure is not limited to such a configuration and the techniques described herein may be applied to horizontal or angled configurations of a motor and gearbox. Accordingly, the terms "top", "bottom", "left", "right", "above", "below", "up", "down", "clockwise" and "counterclockwise" are used for purposes of illustration and are not intended to be limiting in any sense.

Figure 1:
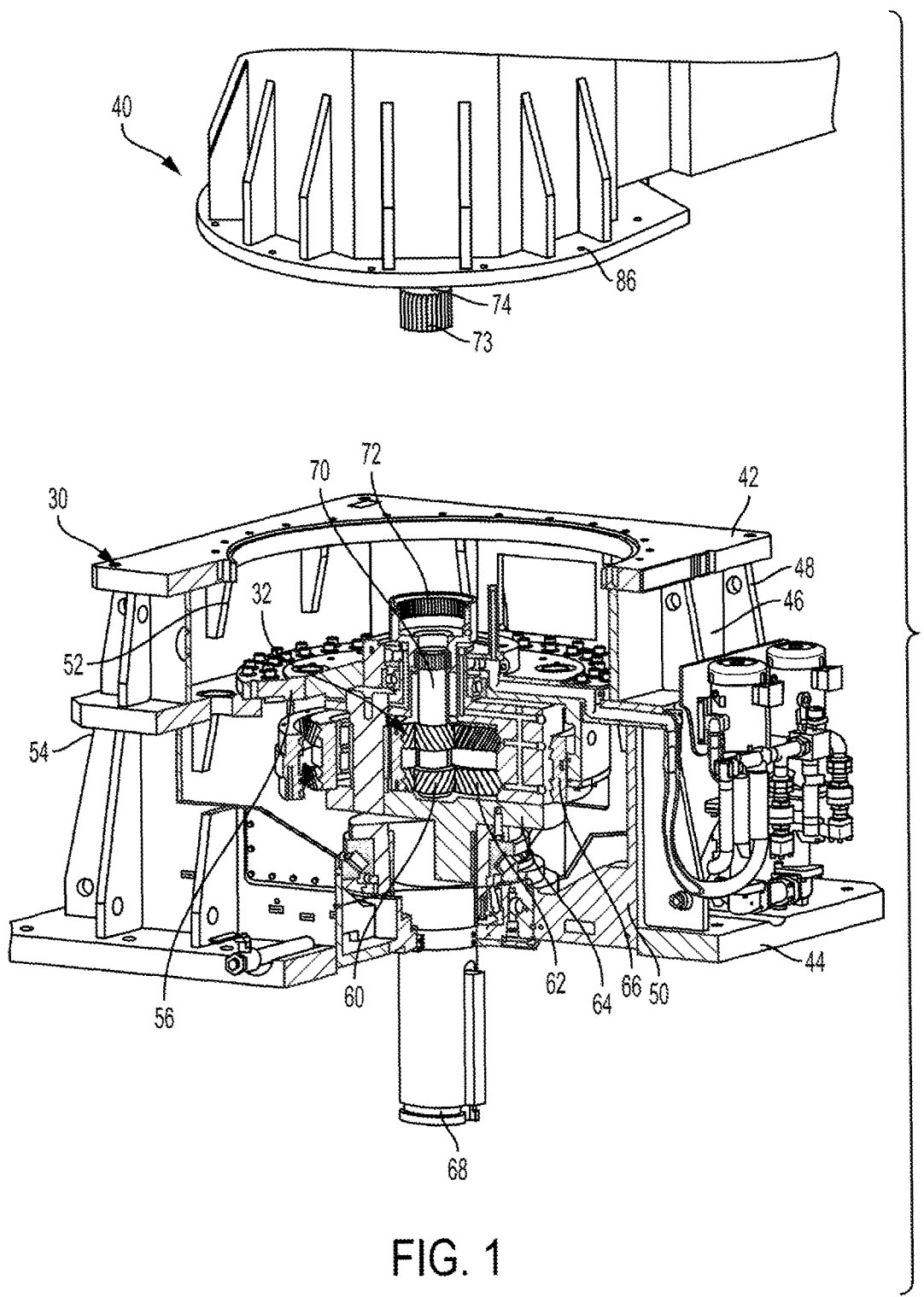
FIG. 1 shows an exemplary motor and housing for an exemplary gear train comprising a planetary gear system with certain features of the motor, housing and gear system shown cut away for ease of illustration.

FIG. 1 shows an exemplary housing 30 containing a gear train 32 and a motor 40. The housing 30 containing the gear train may comprise a fabricated steel housing including a top weldment plate 42 which provides a mount for the motor 40. Opposite the top weldment plate 42, the housing may be provided with a base weldment plate 44. The base weldment plate 44 may provide a mount to a driven load (not show), for instance, a pump. Between the top and base weldment plates 42,44, side walls 46 are provided. Together the top weldment plate 42, base weldment plate 44, and side walls 46 define a hollow interior of the housing 30 in which a gear train, for instance, a planetary gear system is disposed. The housing 30 may also have side flanges 48 extending between the top weldment plate 42 and base weldment plate 44 to provide structural support for the side walls 46. Within the interior of the housing, the housing may be provided with gussets to provide additional structural support. For instance, the housing may be provided with lower interior gussets 50 extending between the base weldment plate 44 and the side walls 46. The lower interior gussets 50 may extend in a radial pattern across the base weldment plate. Additionally, the housing may be provided with upper interior gussets 52. The upper interior gussets 52 may extend between the top weldment plate 42 and the side walls 46. Depending upon the application, the housing 30 may be provided with an intermediate support plate 54. For instance, the intermediate support plate 54 may be disposed between the top weldment plate 42 and the base weldment plate 44 and may extend into the interior of the housing from its connection with the side walls 46. The intermediate support plate 54 may be used to allow attachment of a ring gear support member 56. In FIG. 1, the gear train 32 does not include a clutch, and the ring gear support member 56 may be mounted directly to the intermediate support plate 54. In an alternate configuration, the planetary gear train may include a clutch pack and may not have an intermediate support plate. In such a configuration, the clutch pack and ring gear support member are operatively connected to the top weldment plate with the clutch pack configured to be mounted to the ring gear support member and other components of the clutch operatively mounted to the top weldment plate. FIG. 1 also shows the exemplary gear train 32 comprising a planetary gear system with four major components. A sun pinion 60 may be used to provide high-speed input to the gear train. Around the sun gear 60, planet gears 62 may be arranged with the sun pinion driving the planetary gears. The planet gears 62 may be supported by a planet carrier 64. The entire planet gear carrier assembly (i.e., sun gear, planet gears, and planet carrier) may rotate inside a ring gear 66. The planet carrier 64 may be connected to a low-speed output and the driven equipment through an output shaft 68. The sun pinion 60 may be driven by an input shaft 70. Opposite the sun pinion 60, the input shaft 70 may be splined and connected to the motor 40 via a spool coupling 72 which engages a hub of a motor shaft coupling 73 fixed on a distal end of a shaft 74 of the motor 40. The spool coupling 72 may have splines which engage splines of the motor shaft coupling 73. While the motor shaft coupling 73 may be fixed to the motor shaft and have splines arranged at a distal end of the motor shaft, in the alternative, the motor shaft may have a portion with splines arranged at a distal end of the motor shaft. The sun pinion 60 may be spaced from the spool coupling 72 along the input shaft 70. The ring gear 66 may be supported in the hollow interior of the housing by the ring gear support member 56.

Figure 2:
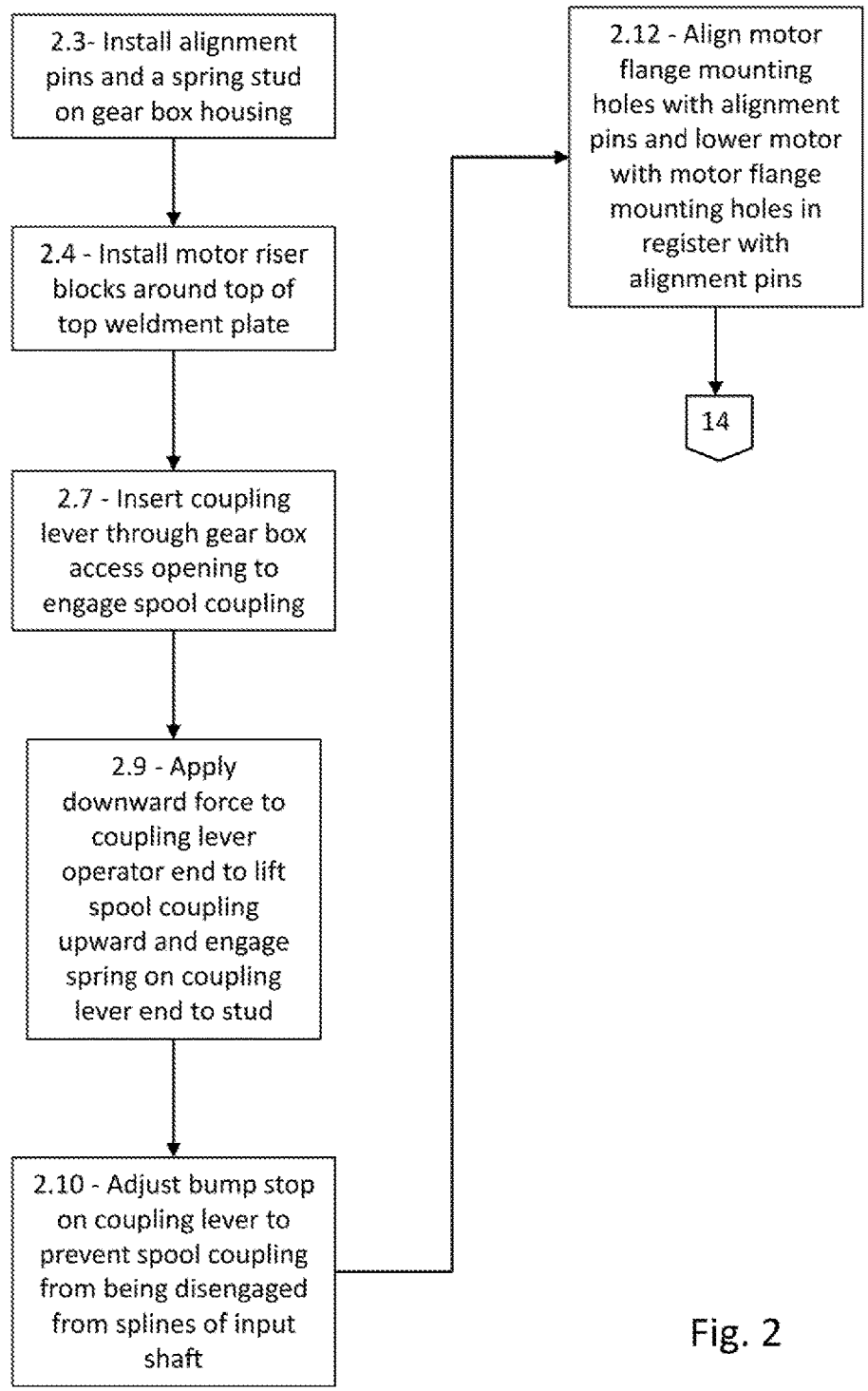
FIG. 2 shows an exemplary process flow chart outlining steps involved in installing the motor of FIG. 1 on the housing of FIG. 1.
Figure 3:
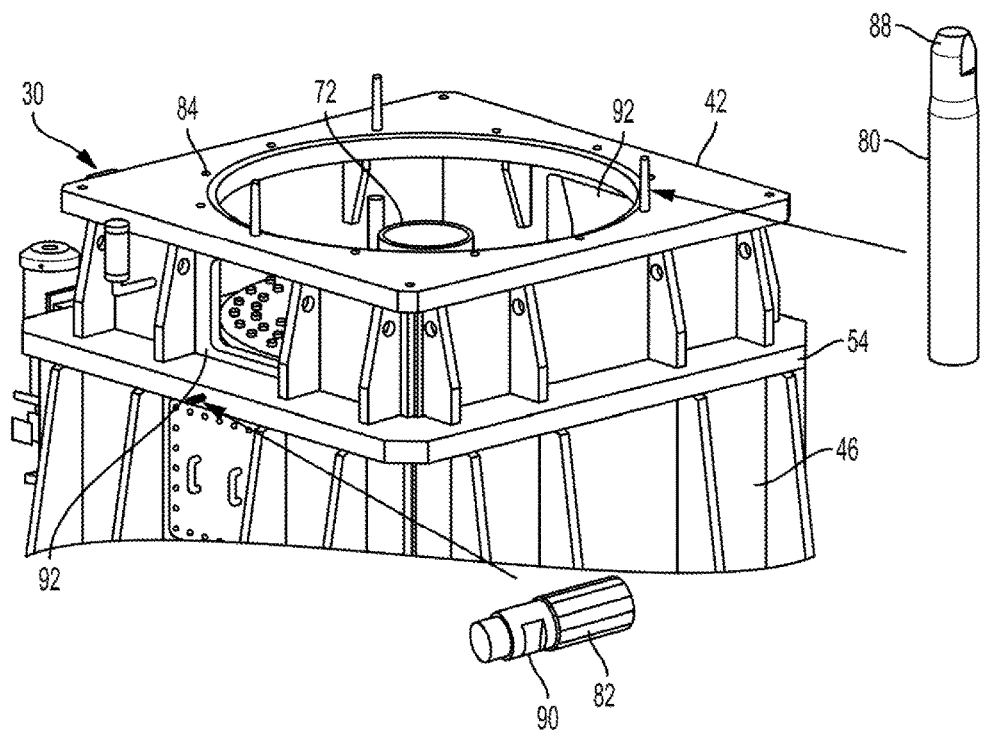
FIG. 3 is a partial perspective view of the housing of FIG. 1 depicting location points for installation of an alignment pin and spring stud in preparation for installation of the motor on the housing.

FIG. 2 outlines an exemplary process flow for a portion of the installation of the motor 40 on the housing 30. To begin the installation (FIG. 2, block 2.3 and FIG. 3), alignment pins 80 and a spring stud 82 may be installed on the gear box housing 30. FIG. 3 shows the housing being prepared for installation of the motor. The top weldment plate 42 may have circumferentially spaced holes 84 that allow for mounting of the motor 40. During installation, the circumferentially spaced top weldment plate mounting holes 84 may become aligned with and brought into register with similar circumferentially spaced, motor driven end flange mounting holes (FIG. 1, '86'), thus allowing the motor to be mounted to the housing. As shown in FIG. 3, the alignment pins 80 may be placed in the circumferentially spaced mounting holes 84. For instance, as shown in FIG. 3, three alignment pins 80 are placed 120 degrees apart. More or less alignment pins may be used depending upon the size of the motor and gear box. The alignment pins 80 may comprise hardened dowels which have a tapered distal end 88. The alignment pins tapered distal end 88 provides a lead-in angle to allow the pins 80 to engage the respective mounting holes 86 on the motor flange. The alignment pins 80 may be press fit into the top weldment plate mounting holes 84. In the alternative, the alignment pins may be mechanically secured to the top weldment plate mounting holes. For instance, the alignment pins may have a threaded proximal end to allow them to be secured to the top weldment plate. In addition to the lead-in tapers formed on the distal end of the alignment pins, the distal ends may have features to allow the alignment pins to be threaded into the top weldment plate with a wrench, screwdriver, or other torque-applying type tool. The spring stud 82 may be applied to the housing 30 in a convenient location. For instance, the side peripheral edges of the intermediate support plate 54 may have a hole to receive the spring stud. The spring stud may be press fit in the hole or may be otherwise mechanically connected to the intermediate support plate, i.e., via threading on a proximal end of the spring stud. The spring stud may have features on its distal end 90 to allow its installation with a wrench, screwdriver, or other torque-applying tool. The spring stud may be installed on the intermediate support plate 54 adjacent to side access openings 92 provided in the side walls 46 of the housing between the top weldment plate 42 and the intermediate support plate 54. The spring stud 82 need only be installed on the housing 30 adjacent one side access opening 92 as will be described in greater detail below.

Figure 4:
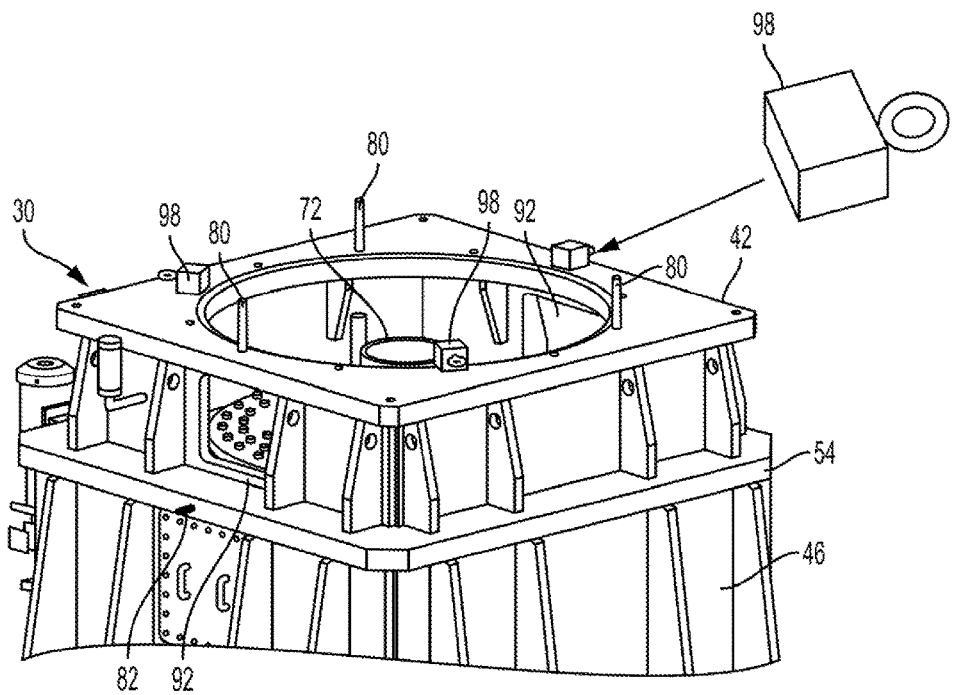
FIG. 4 is a perspective view of the housing of FIG. 1 showing installation points of motor riser blocks in preparation for installation of the motor on the housing.

Referring to the process flow of FIG. 2 (block 2.4) and FIG. 4, motor riser blocks 98 may be installed on the top weldment plate 42. As shown by example in FIG. 4, the motor riser blocks 98 may be placed about the top weldment plate 42 circumferentially at approximately 120 degrees and between the alignment pins 80. The motor riser blocks 98 need not be secured to the top weldment plate, as they will be removed later during the installation. The motor riser blocks 98 may be releasably attached to the top weldment plate in a way that allows their removal laterally across the top weldment plate. For instance, the motor riser blocks may have a magnetic core with a mechanical actuator to actuate and de-activate the magnet attraction of the riser block.

Figure 5:
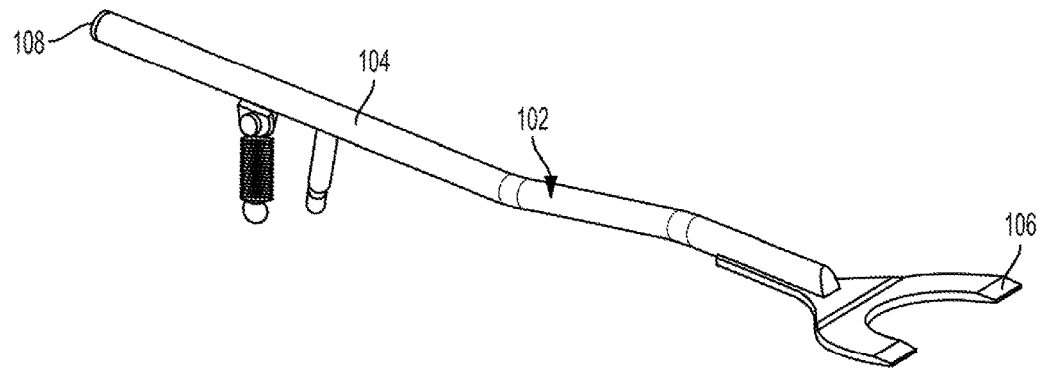
FIG. 5 is a perspective view of a coupling lever used during the installation process.
Figure 6:
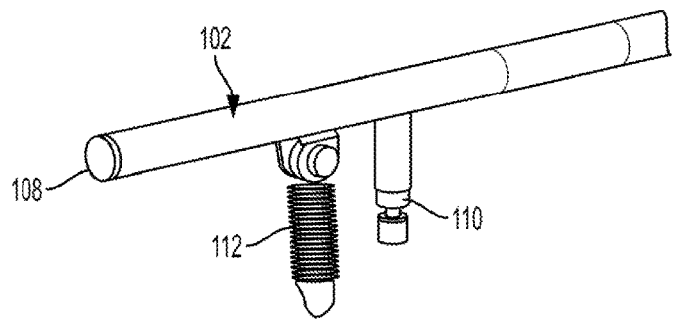
FIG. 6 is a partial alternate perspective view of the coupling lever of FIG. 5.
Figure 7:
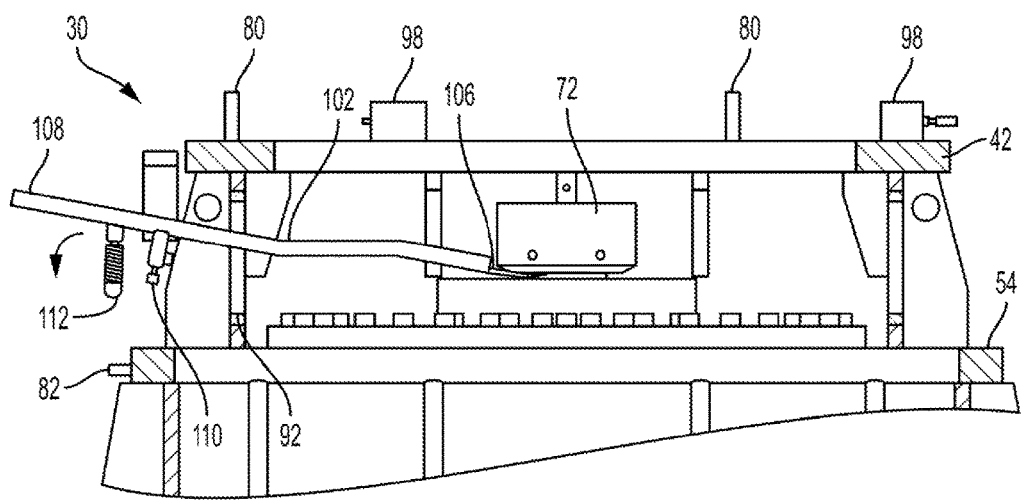
FIG. 7 is a partial cross-sectional view of a top portion of the housing showing installation of the coupling lever under a spool coupling.
Figure 8:
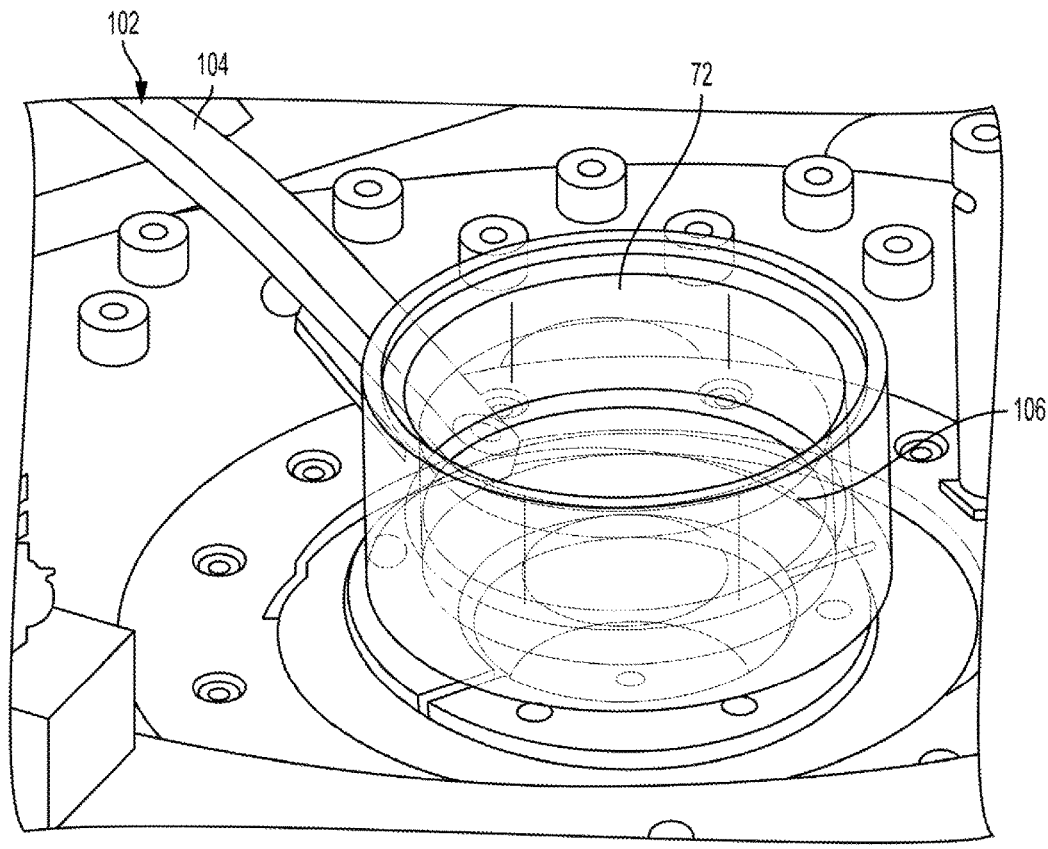
FIG. 8 is a partial enlarged perspective view of the coupling lever engaging the spool coupling with the coupling lever and spool coupling shown in phantom.

Referring to the process flow of FIG. 2 (block 2.7) and FIG. 7, a coupling lever 102 may be inserted through a gear box access opening 92 to engage the spool coupling 72. FIGS. 5 and 6 show the coupling lever 102 which may be used to engage the spool coupling 72 and position the spool coupling axially relative to the gear box input shaft 70. The coupling lever 102 may be formed with a shaft 104 with a bifurcated end 106 and an operator end 108. As shown in FIG. 7, the coupling lever 102 may be inserted through the gear box access 92 opening to engage spool coupling 72. The bifurcations of the bifurcated end 106 may be spaced to allow the coupling lever 102 to accommodate the gear box input shaft 70 as the lever is inserted in the housing interior laterally from the access opening 92 with the bifurcations engaging a bottom surface of the spool coupling 72. As shown in FIG. 8, the bifurcated end 106 may be generally "U"-shaped such that the bottom surface of the spool coupling 72 is engaged except for the space between the bifurcations. The shaft 104 of the coupling lever may be shaped to create a fulcrum point that allows the operator end 108 to be moved downward to cause the bifurcated end 106 to move upward to axially displace the spool coupling 72 along the input shaft 70 of the gear train, and vice-versa. The coupling lever 102 may be shaped to enable the bifurcated end 106 to apply an upward force to the bottom surface of the spool coupling 72 and prevent the spool coupling from becoming cocked and bound on the gear box input shaft 70. For instance, the length and shape of the coupling lever may be configured to be slightly over the center line of the spool coupling when installed on the coupling hub so that when the coupling lever is rotated or pivoted to raise the spool coupling, the spool coupling does not become cocked and bound on the gear box input shaft. While a lever may be used to manually move the spool coupling, the spool coupling may also be moved with a screw type or ratcheting lift, or a pneumatic or hydraulic actuator or piston.

The operator end 108 of the coupling lever 102 may have a stop 110 and an extension spring 112. The stop 110 may have a dimension to allow the operator end 108 of the coupling lever 102 to be moved to a position where the stop engages the housing 30, which in turn allows the bifurcated end 106 of the coupling lever to axially displace the coupling hub 72 along the input shaft 70. The stop 110 may be adjustable to allow increased operating flexibility in using the coupling lever. The extension spring 112 may be configured to engage the spring stud 82 and hold the coupling lever operator end 108 in position, for instance, holding the stop 110 in engagement with the housing, and thus maintaining the coupling hub 72 at a desired position on the gear box input shaft 70.

Figure 9:
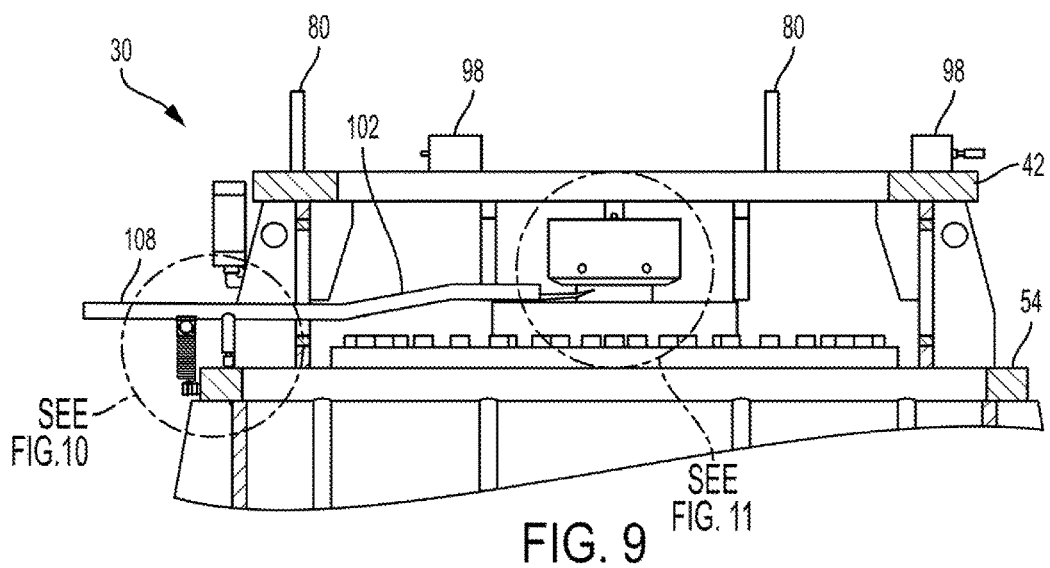
FIG. 9 is a partial side cross-sectional view of the housing showing the coupling lever engaging the spool coupling and moving the coupling hub to an upward position with an extension spring extending between the coupling lever and the spring stud previously installed on the housing.
Figure 10:
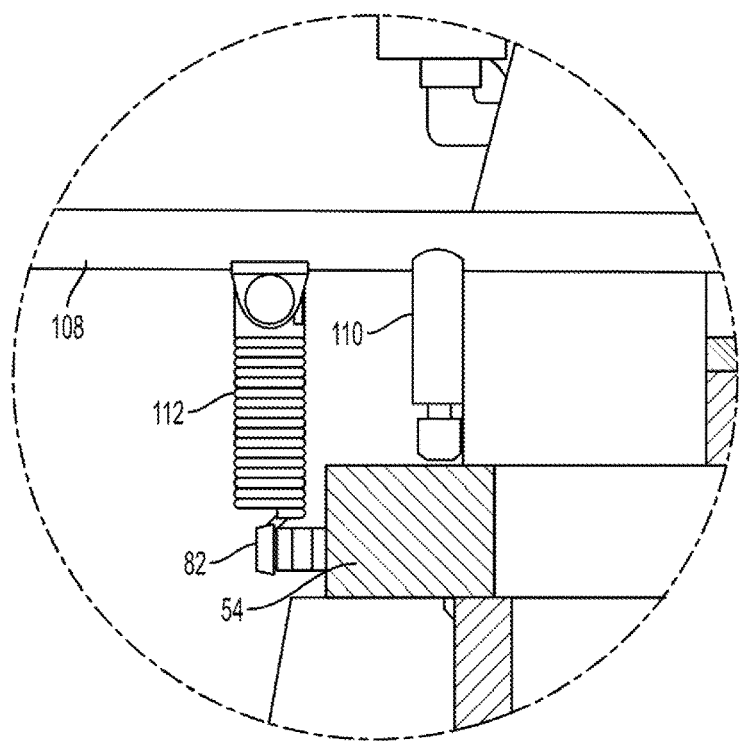
FIG. 10 is an enlarged view taken from detail area 10-10 of FIG. 8.
Figure 11:
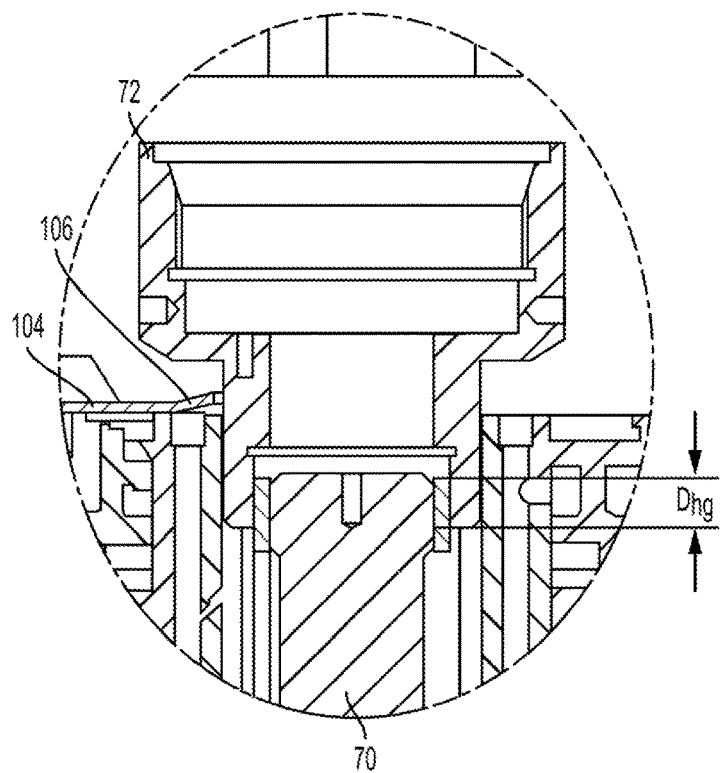
FIG. 11 is an enlarged view taken from detail area 11-11 of FIG. 8.

Referring to FIG. 2 (blocks 2.9 and 2.10) and FIGS. 9-11, downward force may be applied to coupling lever operator end 108 to lift spool coupling upward 72 along the input shaft. With the coupling lever bifurcated end 106 engaging the spool coupling bottom surface, the coupling lever operator end 108 may be pivoted downward to displace the spool coupling toward a distal end of the input shaft 70 of the gear train. The coupling lever may be pivoted until the stop 110 engages the housing indicating that the spool coupling 72 has been moved upwardly and vertically to the desired position on the gear box input shaft 70. The extension spring 112 may be engaged with the spring stud 82 to hold the coupling lever in place. The extension spring 112 prevents the weight of the coupling hub 72 from moving the coupling lever. For instance, the spring 112 holds the operator end 108 of the coupling lever down, which in turn urges the coupling lever bifurcated end 106 upward against the coupling hub 72. The spring 112 may allow for "hands-free" positioning of the coupling lever and spool coupling when lowering the motor. While the extension spring may be used to assist the operator in positioning the spool coupling with the coupling lever, the spring may be eliminated and the operator may hold the coupling lever in position. For instance, the process flow and drawings of FIGS. 26-34 detail an alternative process, which will be described in more detail below, where the spring on the coupling lever is not used. Thus, depending upon the process employed, the coupling lever may provide sufficient tactile feedback to the operator when the desired motor coupling height is achieved, and the coupling lever spring and/or the stop need not be incorporated on the lever or used by the operator.

FIG. 10 provides an enlarged view of detail area 10-10 of FIG. 9, and the engagement of the extension spring 112 with the spring stud 82 and the engagement of the stop 110 with the intermediate support plate 54 of the housing. The dimension of the stop 110 may be set or adjusted as necessary to provide the needed vertical displacement of the spool coupling 72 relative to the gear train input shaft 70. The dimension of the stop 110 may be set or adjusted as necessary to prevent the coupling 72 from lifting off the gear box input shaft 70. In one aspect, the spool coupling may have internal splines that engage splines on the gear box input shaft. The splines of the spool coupling and the gear box input shaft may have a length to allow the spool coupling to move axially along the gear box input shaft as necessary.

FIG. 11 provides an enlarged view of detail area 11-11 of FIG. 9 in which the spool coupling 70 is moved vertically upward along the gear train input shaft 70 toward a distal end of the input shaft. For instance, the axial length of the splines of the spool coupling 72 and the gear box input shaft 70 may be sized to allow the spool coupling to travel vertically upward from a starting position where the hub and input shaft splines are fully drivingly engaged to a first alignment position where a lesser length, e.g., approximately half of the length of coupling hub splines, are drivingly engaged with the gear box input shaft splines. The upward vertical translation of the coupling hub 72 on the input shaft 70 may correspond to downward travel of the operator end 108 of the coupling lever 102, so that with the stop 110 engaging the housing, the coupling hub may be positioned at the first alignment position. For instance, as shown in FIG. 11, the splines of the spool coupling 72 and the gear train input shaft 70 are engaged a distance ($D_{hg}$) (i.e., a first alignment position), which is less than the starting position of the coupling hub, as in FIG. 11, the coupling hub is shown lifted vertically upward along the input shaft by action of the coupling lever bifurcated end 106.

While the drawings show the stop providing a positive indication that the spool coupling has been moved the proper distance vertically upward on the gear box input shaft, other techniques may also be used. For instance, the angle of bend on the coupling lever shaft and the location of the fulcrum point on the coupling lever may be set to provide the operator with a "tactile stop," indicating that the spool coupling has been moved the proper distance vertically upward on the gear box input shaft. As another example, when the operator end of the coupling lever contacts the edges of the housing access opening, this may indicate to the operator that the spool coupling has been moved the desired vertical distance (i.e., the distance necessary to engage the motor output shaft without disengaging the gear train input shaft). As another example, rather than providing the stop on the coupling lever, the stop may be formed in the housing or attached to the housing during installation, or a combination thereof.

Figure 12:
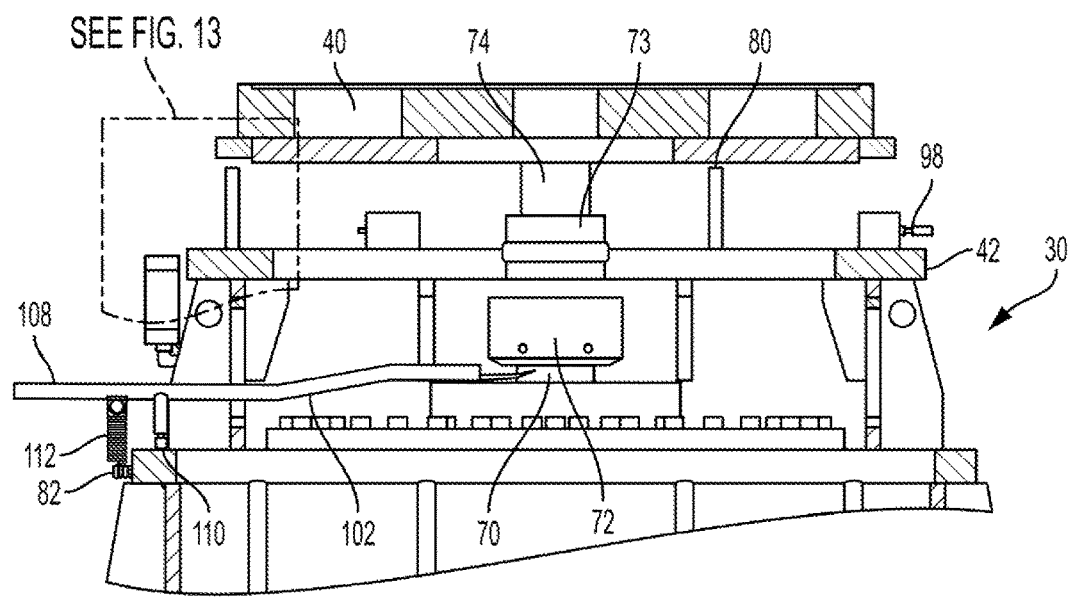
FIG. 12 is a partial side cross-sectional view of the housing with the lower portion of the motor positioned above the housing.
Figure 13:
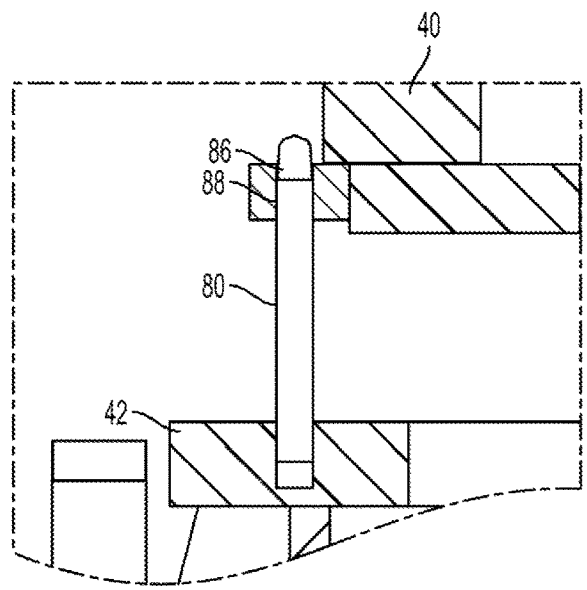
FIG. 13 is an enlarged area from detail area 13-13 of FIG. 12.

Making reference to FIG. 2 (block 2.12) and FIGS. 12-13, with the coupling lever 102 in place and the spool coupling 72 vertically displaced along the gear box input shaft 70, the motor may be lowered to a position such that the motor flange mounting holes 86 are brought into register with the alignment pins 80. The motor may be lowered in position until the motor flange mounting holes 86 engage the alignment pins 80. The tapered distal ends 88 of the alignment pins 80 may facilitate guiding and aligning of the motor 40 with the housing 30.

Figure 14:
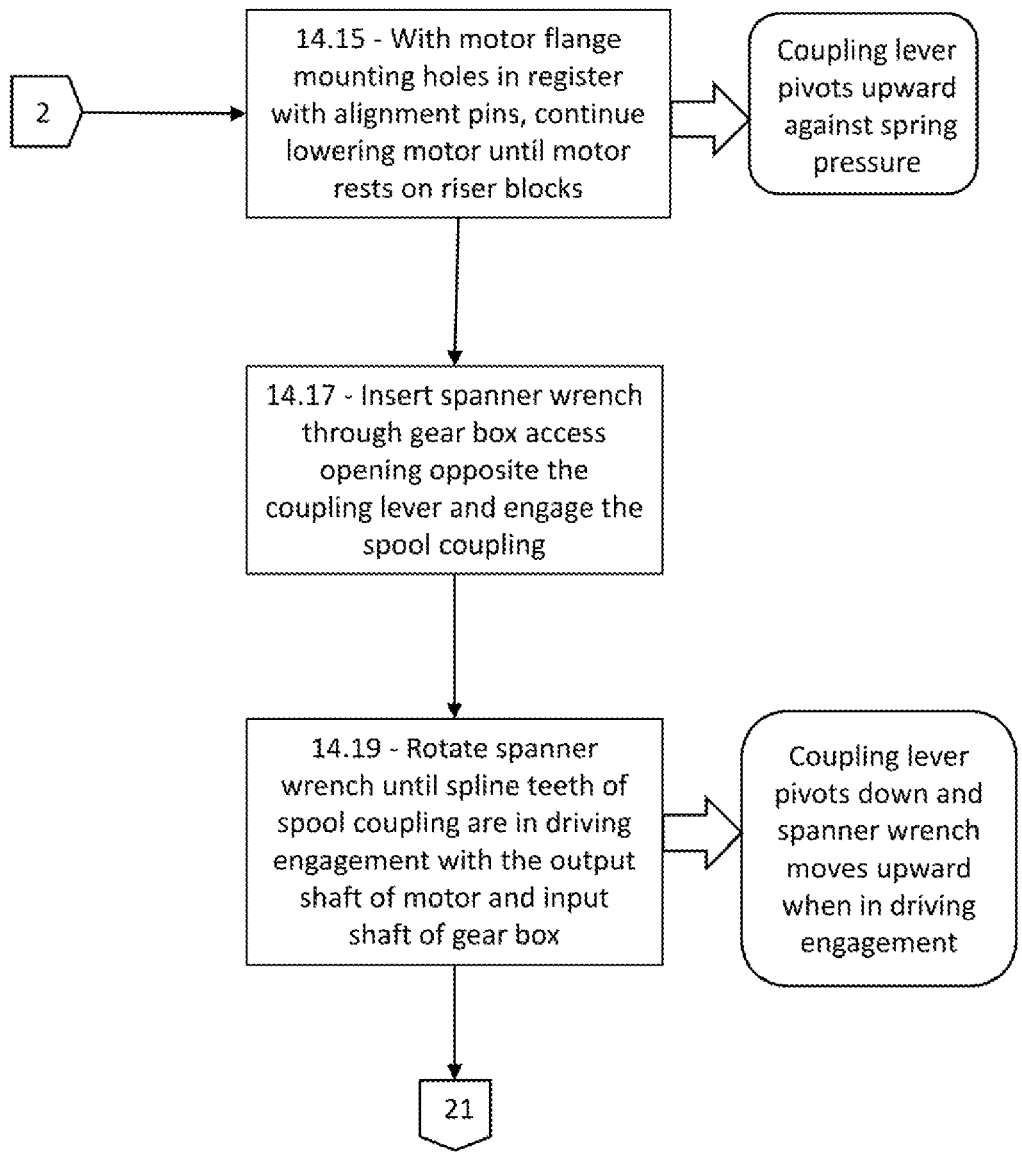
FIG. 14 shows an exemplary process flow with additional steps involved in the process of installing the motor of FIG. 1 on the housing of FIG. 1.
Figure 15:
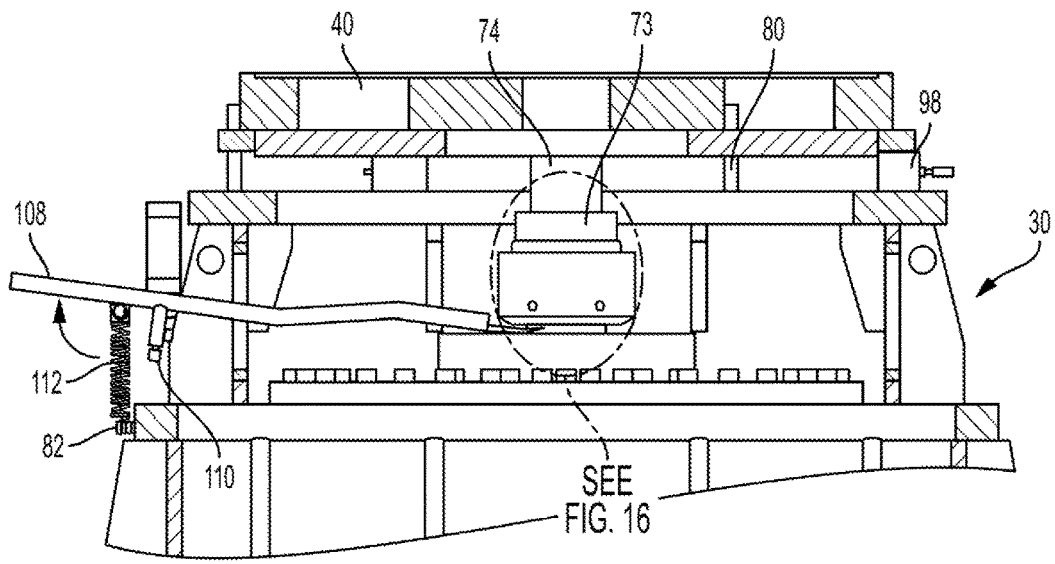
FIG. 15 is a partial side cross-sectional view of the housing with the motor resting on the motor riser blocks and the motor flange holes in register with alignment pins previously installed on the housing.
Figure 16:
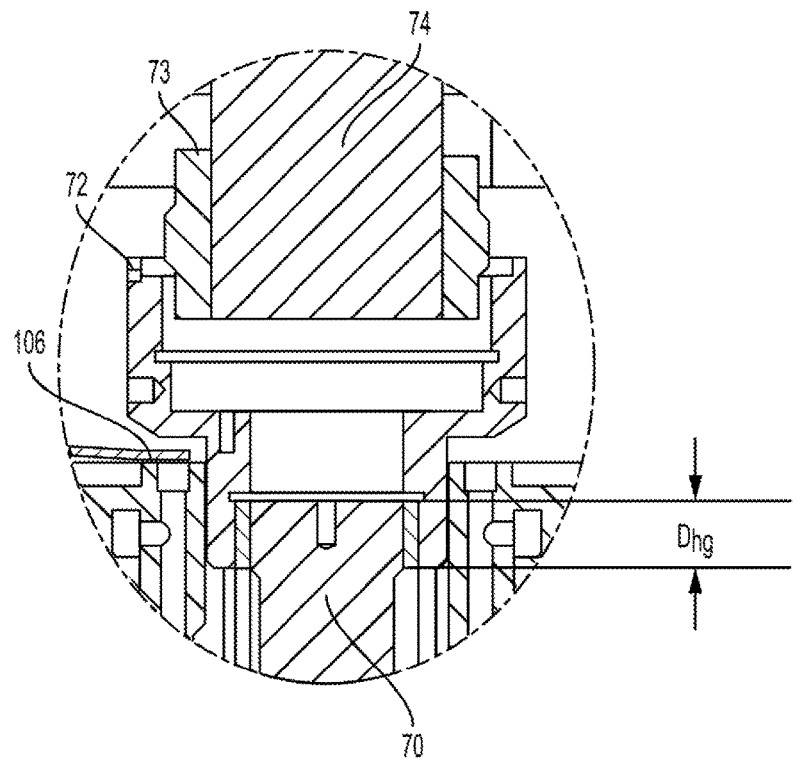
FIG. 16 is an enlarged view taken from detail area 16-16 of FIG. 15.

FIG. 14 outlines additional steps to the process flow of FIG. 2. Making reference to FIG. 14 (block 14.15) and FIGS. 15-16, lowering of the motor 40 may continue until an intermediate position where the motor comes to rest on the motor riser blocks 98. Once the motor 40 is lowered into the intermediate position on the riser blocks 98 with the alignment pins 80 engaged with the motor flange mounting holes 86, the motor shaft coupling 73 extends into the housing interior and contacts the spool coupling 72. If the motor shaft coupling 73 and the spool coupling are aligned, the upward urging of the coupling lever 102 by the spring 112 may allow the spool coupling 72 to be placed in driving engagement with the motor shaft coupling 73. If, on the other hand, the motor shaft coupling 73 is not aligned or otherwise in driving engagement with the spool coupling 72 but only in contact therewith, the motor shaft coupling drives the spool coupling downward along the gear train input shaft 70. For instance, splines of the motor shaft coupling 73 may not be in driving engagement with the splines of the spool coupling 72 at the intermediate position of the motor on the riser blocks, and the non-engagement may drive the spool coupling downward along the gear box input shaft. The engagement distance ($D_{hg}$) of the spool coupling 72 with the gear train input shaft 70 may increase from that shown in FIG. 11 as the spool coupling slides down the gear train input shaft 70. As the spool coupling 72 is driven downward against the coupling lever bifurcated end 106, the operator end 108 of the coupling lever may rotate clockwise or upward (in FIG. 15). The extension spring 112 may become tensioned as the coupling lever operator end 108 rotates clockwise or moves vertically upward. The tension in the extension spring 112 biases the coupling lever bifurcated end 106 upward, maintaining force against the bottom surface of the spool coupling 72. The extension spring 112 may cause the bifurcated end 106 of the coupling lever 102 to hold the spool coupling 72 firmly against the motor shaft coupling 73 while the motor output shaft and spool coupling remain non-engaged.

Figure 17:
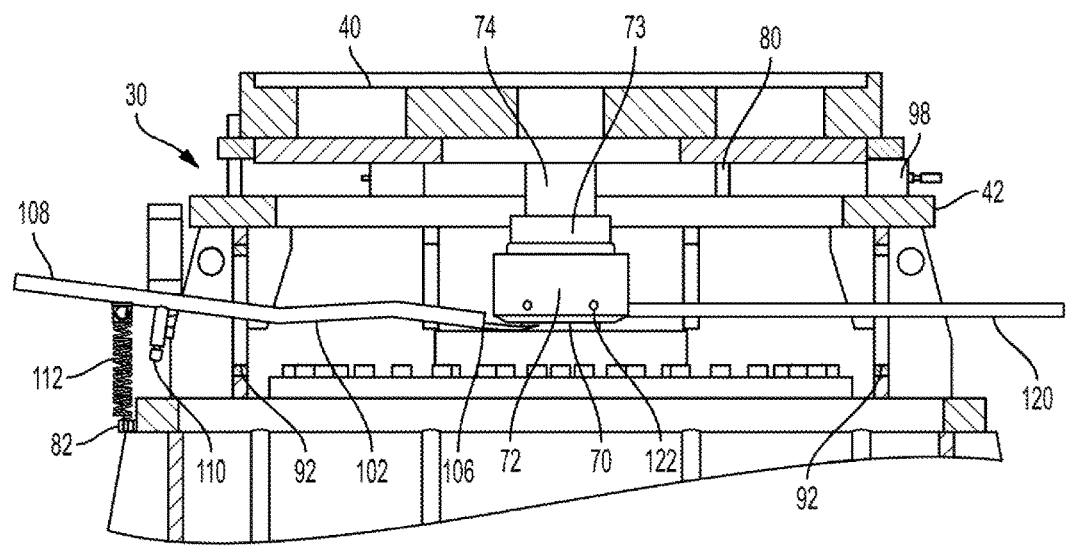
FIG. 17 is a partial side cross-sectional view of the housing showing a spanner wrench being inserted into the housing to engage the spool coupling to rotate the coupling hub.
Figure 18:
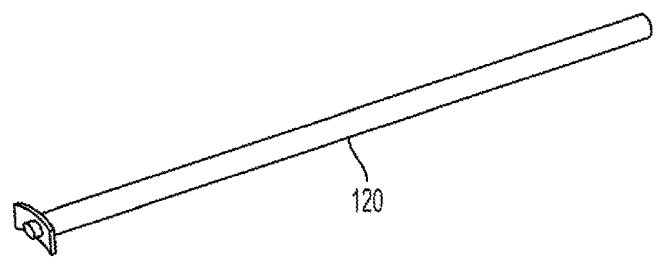
FIG. 18 is a perspective view of the spanner wrench of FIG. 17.

Making reference to FIG. 14 (block 14.17) and FIGS. 17-18, a spanner wrench 120 may be inserted through the gear box access opening 92 opposite the coupling lever 102 to engage the spool coupling 72. The spanner wrench 120 may engage radial holes 122 circumferentially spaced along the spool coupling 72 outer diameter surface. The spanner wrench 120 may be used to rotate the spool coupling 72 relative to the motor shaft coupling 73 and output shaft 74 to place the spool coupling in driving engagement with the motor output shaft. For instance, the spanner wrench may allow the spool coupling 72 to be rotated relative to the motor shaft coupling 73 so that the splines of the spool coupling may be placed in driving engagement with the splines of the motor output shaft. In the alternative, the spanner wrench may be eliminated and the coupling lever may also be configured to allow for rotation of the spool coupling and to allow engagement of the spool coupling with the motor output shaft.

Figure 19:
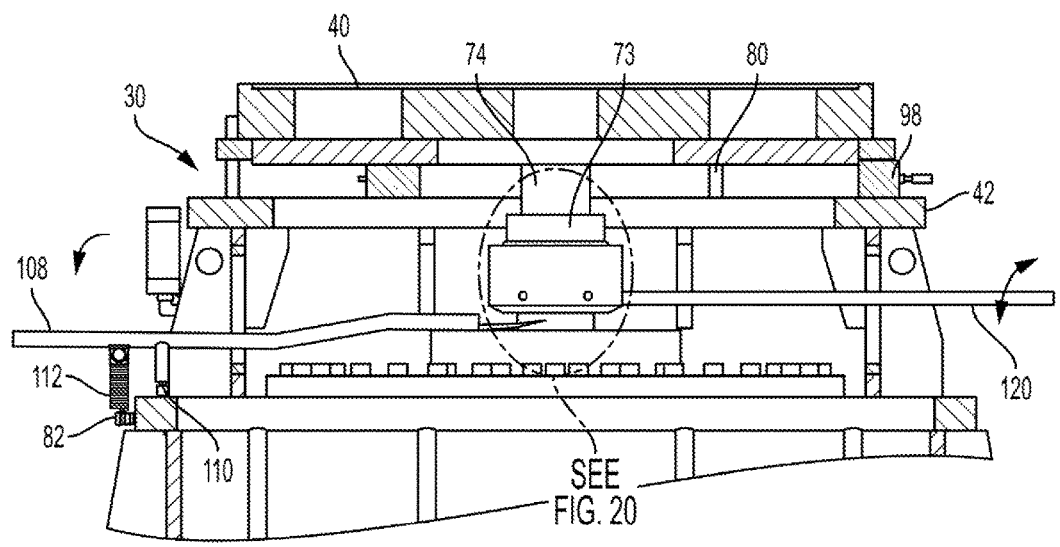
FIG. 19 is a partial side cross-sectional view of the housing showing the spanner wrench rotating the spool coupling to a position where the spool coupling is in driving engagement with the motor output shaft.
Figure 20:
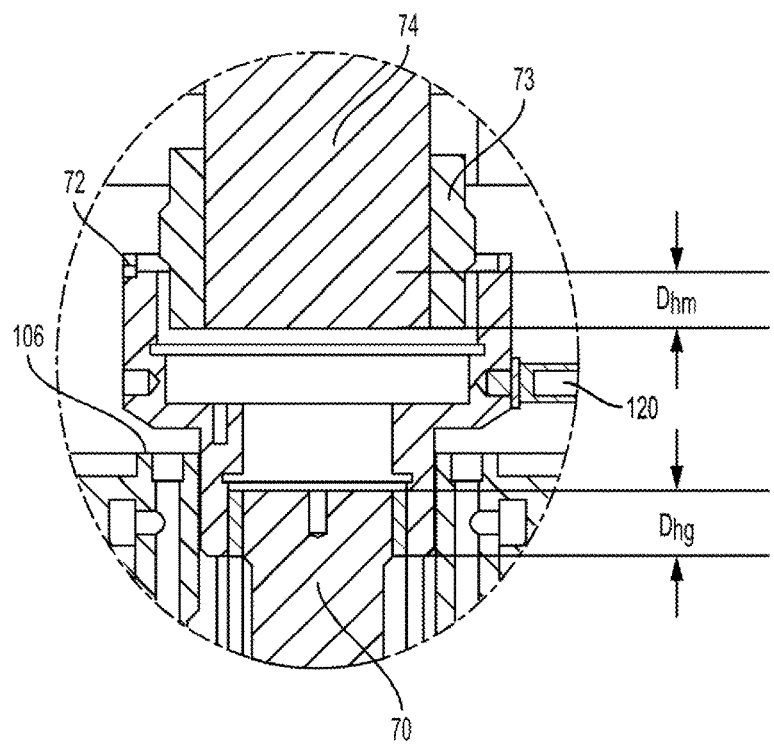
FIG. 20 is an enlarged view of detail area 20-20 of FIG. 19.

Making reference to FIG. 14 (block 14.19) and FIGS. 19-20, the spanner wrench 120 may be rotated about the gear box input shaft center axis until the spool coupling and the motor shaft coupling 73 are in driving engagement. Once the spool coupling 72 and the motor shaft coupling 73 are in driving engagement, the spool coupling may be able to be moved vertically along the gear box input shaft 70 and the motor output shaft to a second alignment position. As shown in FIG. 19, the operator end 108 of the coupling lever 102 may rotate counter-clockwise or downward as the splines of the spool coupling and the motor shaft coupling become drivingly engaged. The action of the extension spring 112 may allow the vertical movement of the coupling hub 72 along the gear box input shaft 70 and the motor shaft coupling 73, or an operator may apply downward force on the coupling lever operator end to move the spool coupling vertically upward along the gear box input shaft and the motor output shaft. For instance, once the spline teeth of the spool coupling and the motor output shaft become engaged, the spool coupling will be able to move vertically upward on the gear box input shaft splines and more fully onto the motor output shaft splines. Visual indicators may be used to assist in alignment and placing the spool coupling into driving engagement with the motor shaft coupling. For instance, scribe lines may be placed on the spool coupling outer diameter and motor shaft coupling to indicate alignment. As shown in FIG. 20, the engagement distance ($D_{hg}$) of the spool coupling 72 and the gear train input shaft 70 decreases from that shown in FIG. 16 as the spool coupling slides upward on the gear train input shaft. The engagement distance ($D_{hm}$) of the spool coupling 72 and the motor shaft coupling 73 increases as the spool coupling slides upward onto and in driving engagement with the motor shaft coupling. By way of example, the axial length of the splines of the spool coupling may be sized so that approximately one half are engaged by the splines of the motor output shaft and the other half are engaged by the splines of the gear box input shaft. The motor riser blocks 98 may be sized based upon the axial length of the splines of the spool coupling to facilitate the spool coupling being rotated with the spanner wrench and being placed in driving engagement with the motor output shaft.

Figure 21:
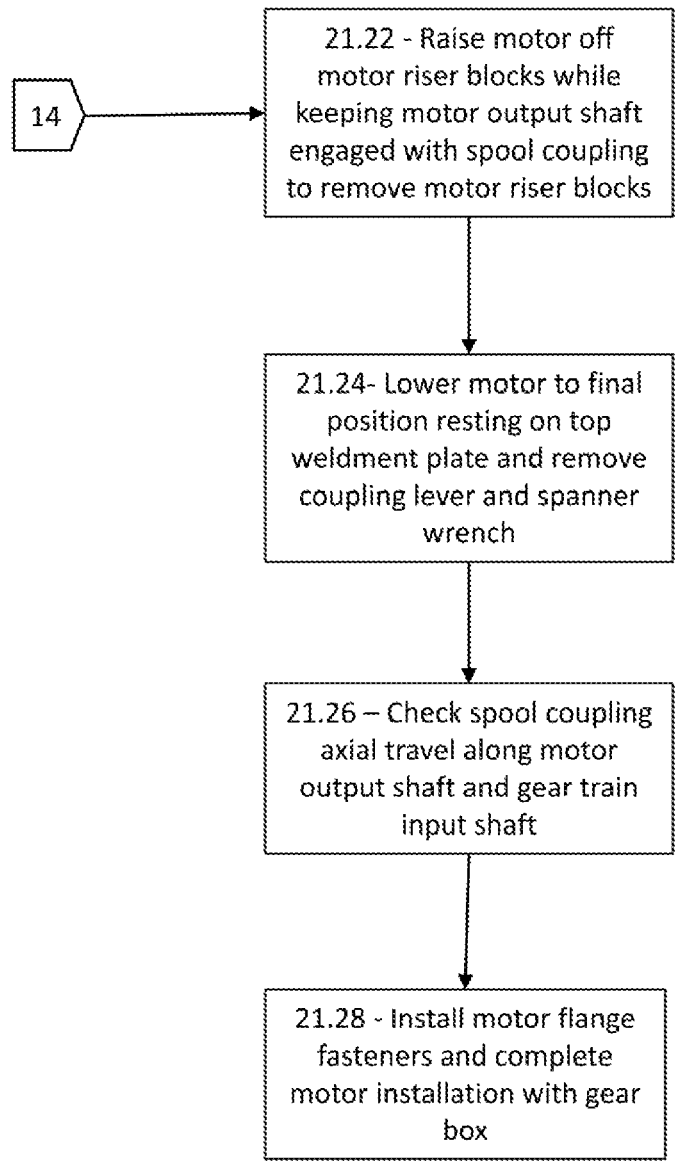
FIG. 21 shows an exemplary process flow with additional steps involved in installing the motor of FIG. 1 on the housing of FIG. 1.
Figure 22:
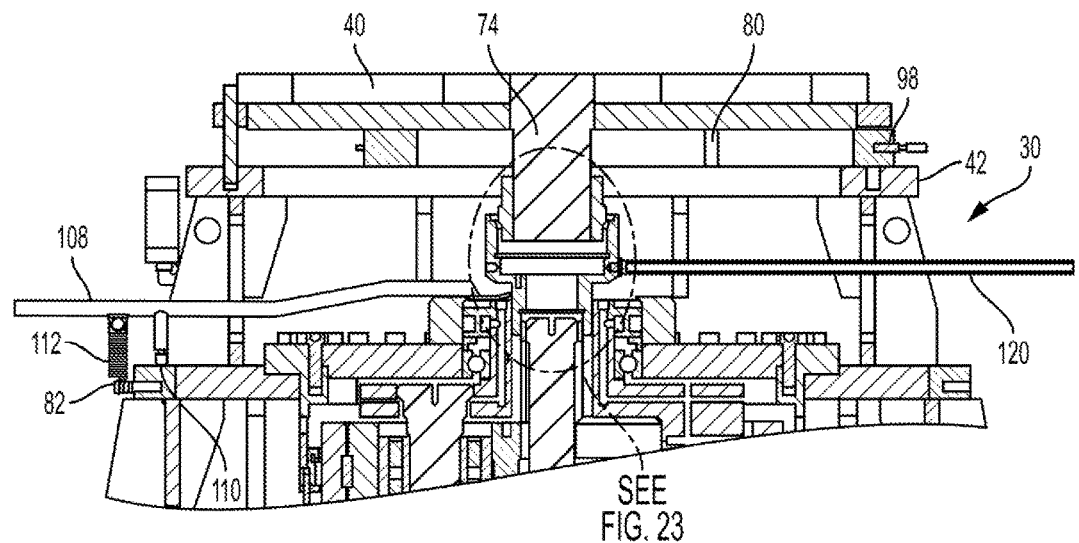
FIG. 22 is a partial side cross-sectional view of the housing showing the motor raised off of the motor riser blocks a distance sufficient to allow removal of the motor riser blocks.
Figure 23:
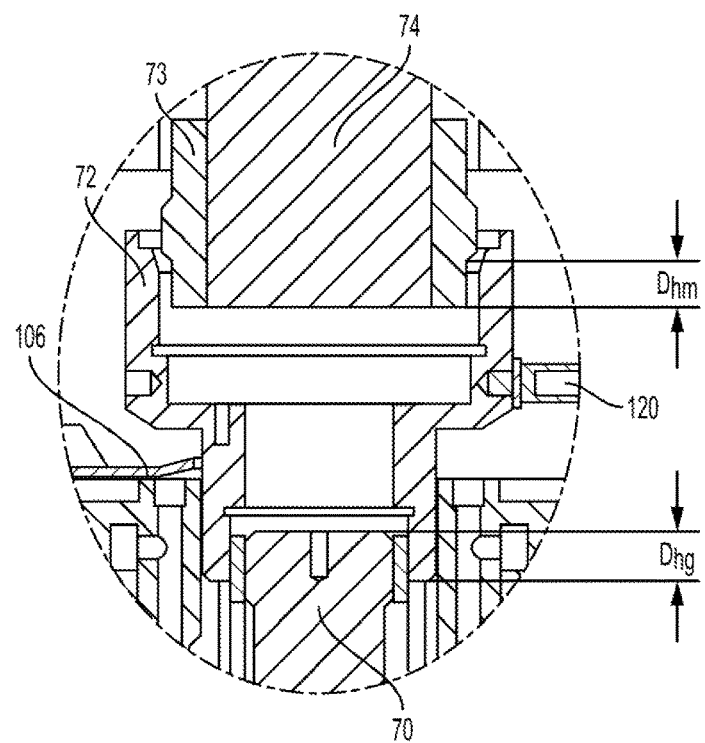
FIG. 23 is an enlarged view of detail area 23-23 of FIG. 22.

FIG. 21 outlines additional steps to the process flows of FIGS. 2 and 14. Making reference to FIG. 21 (block 21.22) and FIGS. 22-23, the motor riser blocks 98 may be removed by raising the motor 40 slightly off the motor blocks. The distance of vertical movement of the motor 40 is such to prevent disengagement of the spool coupling 72 from the motor shaft coupling 73 while allowing the motor riser blocks 98 to be removed laterally from the top weldment plate 42. As shown in FIG. 23, the engagement distance ($D_{hg}$) of the spool coupling 72 and the gear train input shaft 70 may decreases from that shown in FIG. 20 as the spool coupling may tend to slide upward on the gear train input shaft as the motor shaft coupling 73 is released slightly from the motor coupling as the motor is raised and the coupling lever urges the coupling upward. The engagement distance ($D_{hm}$) of the spool coupling 72 and the motor shaft coupling 73 may change slightly as the motor is raised away from the coupling. The coupling hub may continue to follow the motor output shaft as the coupling hub is urged upward by the extension spring acting on the coupling lever operator end 108.

Figure 24:
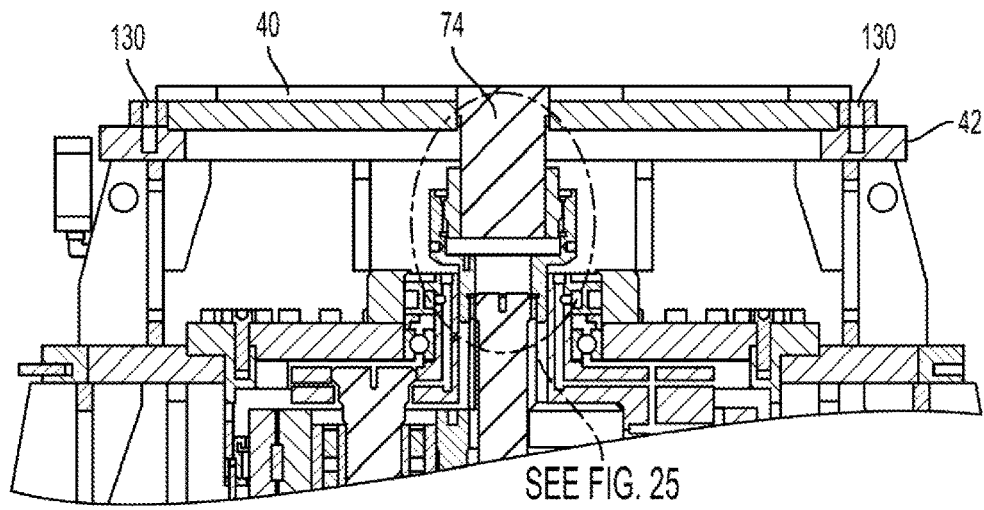
FIG. 24 is a partial cross-sectional view of a side of the housing with the motor mounted on the top weldment plate of the housing.
Figure 25:
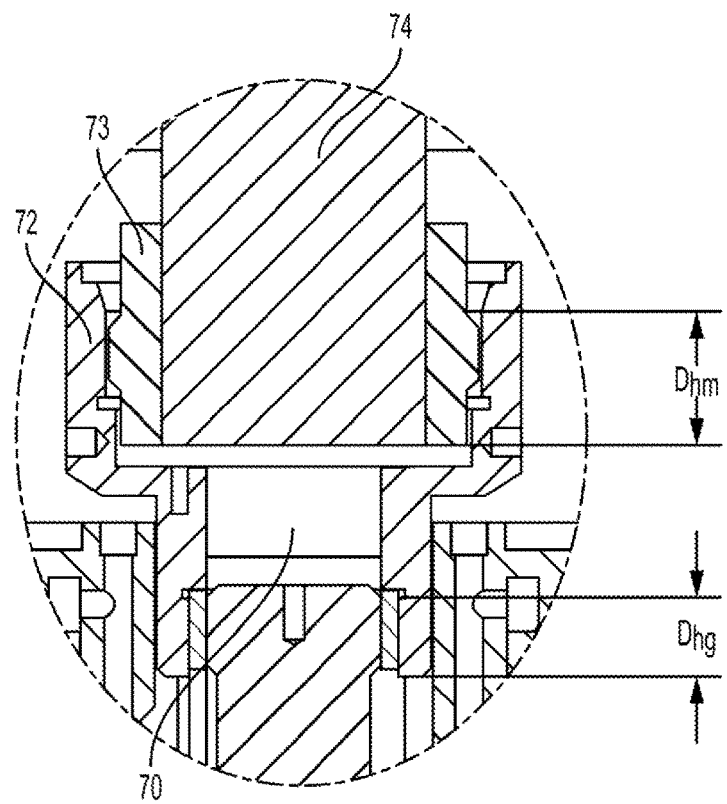
FIG. 25 is an enlarged view of detail area 25-25 of FIG. 24.

Making reference to FIG. 21 (block 21.24-21.26) and FIGS. 24-25, with the motor riser blocks 98 removed, the motor 40 may be lowered slowly to maintain proper alignment and engagement of the motor shaft coupling 73 with the spool coupling 72. The engagement distance ($D_{hm}$) of the spool coupling 72 and the motor shaft coupling 73 increases as the motor output shaft becomes more fully inserted in the spool coupling. With the motor 40 lowered to its final position with the motor flange abutting the top weldment plate 42, the spool coupling 72 may be in the third alignment position with the spool coupling drivingly engaging the motor output shaft and the gear box input shaft. The spanner wrench 120 may be removed through the side access opening 92. The coupling lever 102 may also be removed. The coupling lever operator end 108 may be disengaged from the spring stud 82 and the coupling lever 102 may be rotated upward or clockwise (in FIG. 24) to allow the coupling lever bifurcated end 106 to be disengaged from the spool coupling 72. Once the coupling lever 102 is removed from the spool coupling 72, it may be withdrawn through the side access opening 92. The spanner wrench 120 and coupling lever 102 may be removed prior to or after the full weight of the motor 40 being applied to the gear box housing 30. Once the motor is resting on the gear box top weldment plate, the axial travel of the spool coupling 72 may be checked to ensure the spool coupling is not bound between the end of the motor shaft coupling 73 and the end of the gear box input shaft. It is desired that the spool coupling have axial travel along the motor output shaft and the gear box input shaft to account for thermal growth and dimensional tolerance variation. The coupling lever may be used to check for the required amount of axial travel. Thereafter, the alignment pins 80 may be removed from the top weldment plate mounting holes 84 and motor flange fasteners 130 may be installed in the top weldment plate mounting holes and the motor flange holes 86 and to secure the motor to the housing.

Figure 26:
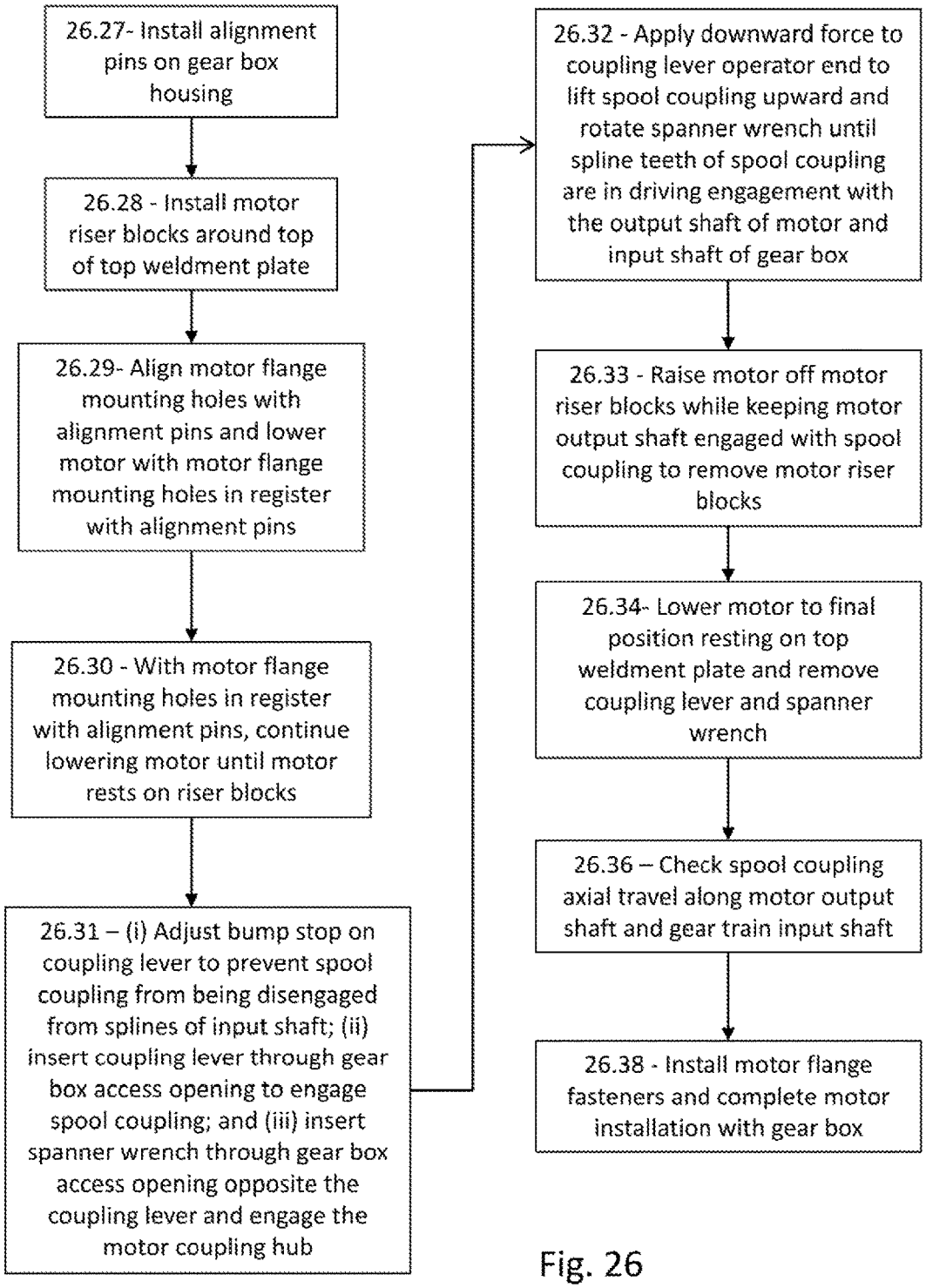
FIG. 26 shows an alternative exemplary process flow for installing the motor on the gear box.
Figure 27:
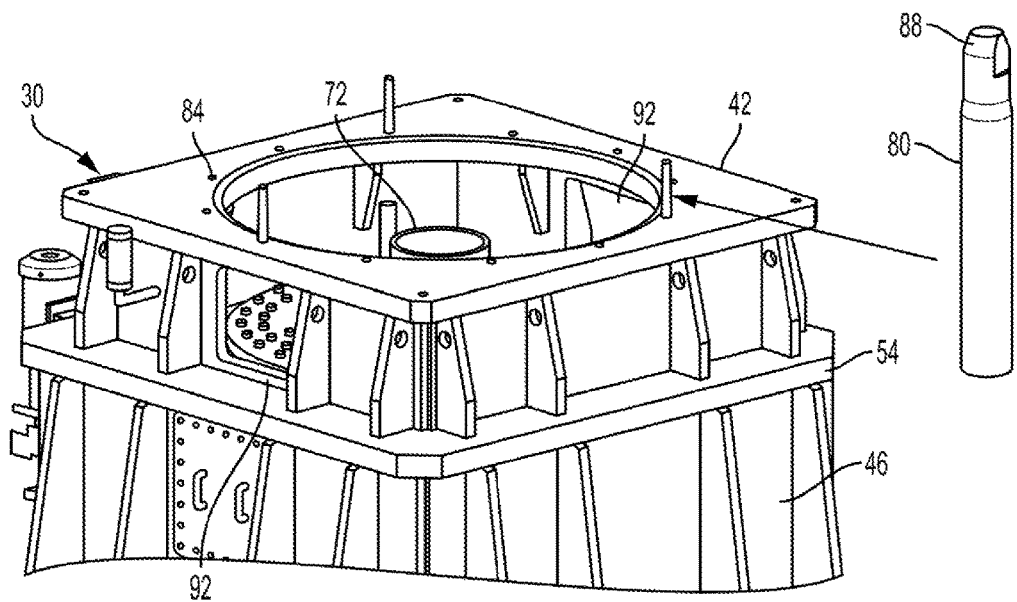
FIG. 27 is a partial perspective view of the housing of FIG. 1 depicting location points for installation of an alignment pin and spring stud in preparation for installation of the motor on the housing in accordance with the process flow of FIG. 26.
Figure 28:
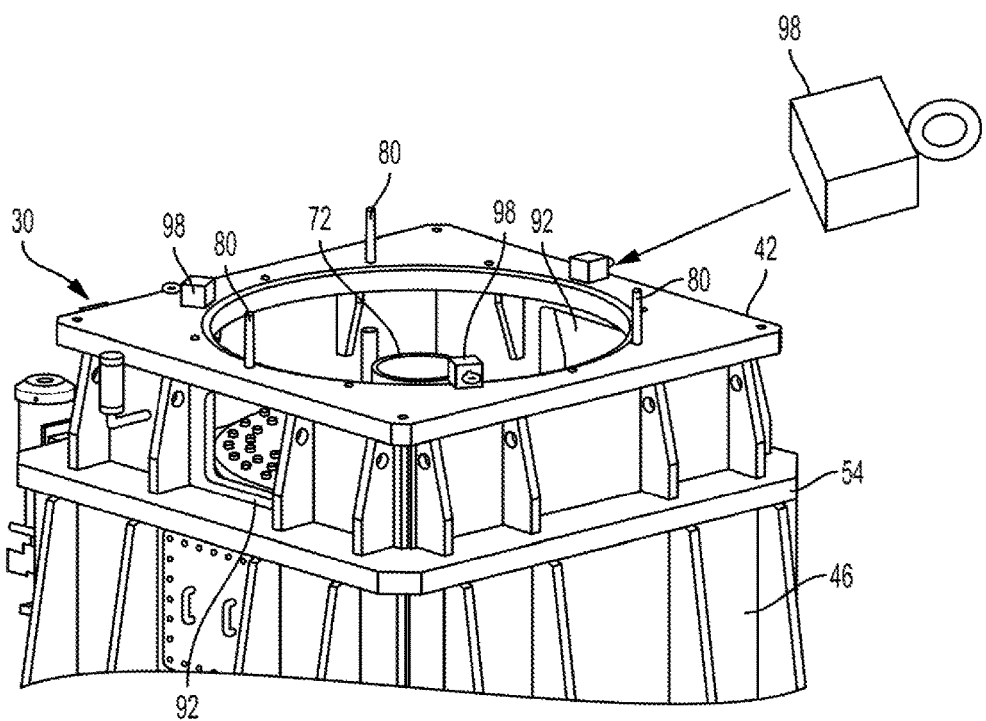
FIG. 28 is a perspective view of the housing of FIG. 1 showing installation points of motor riser blocks in preparation for installation of the motor on the housing in accordance with the process flow of FIG. 26.
Figure 29:
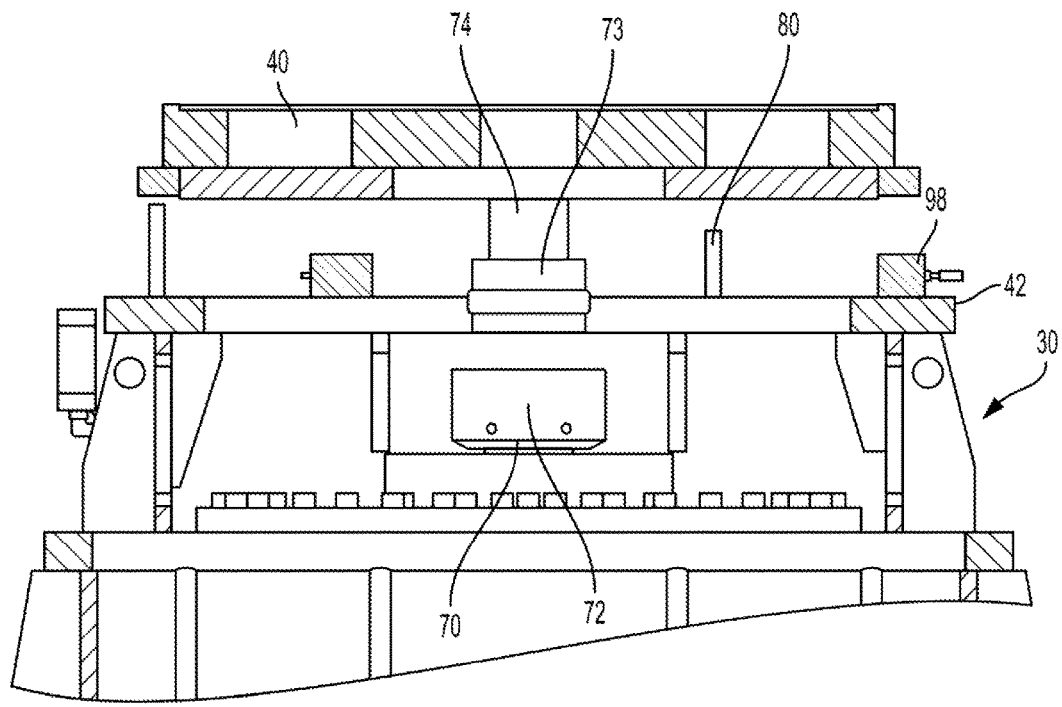
FIG. 29 is a partial side cross-sectional view of the housing with the lower portion of the motor positioned above the housing in accordance with the process flow of FIG. 26.
Figure 30:
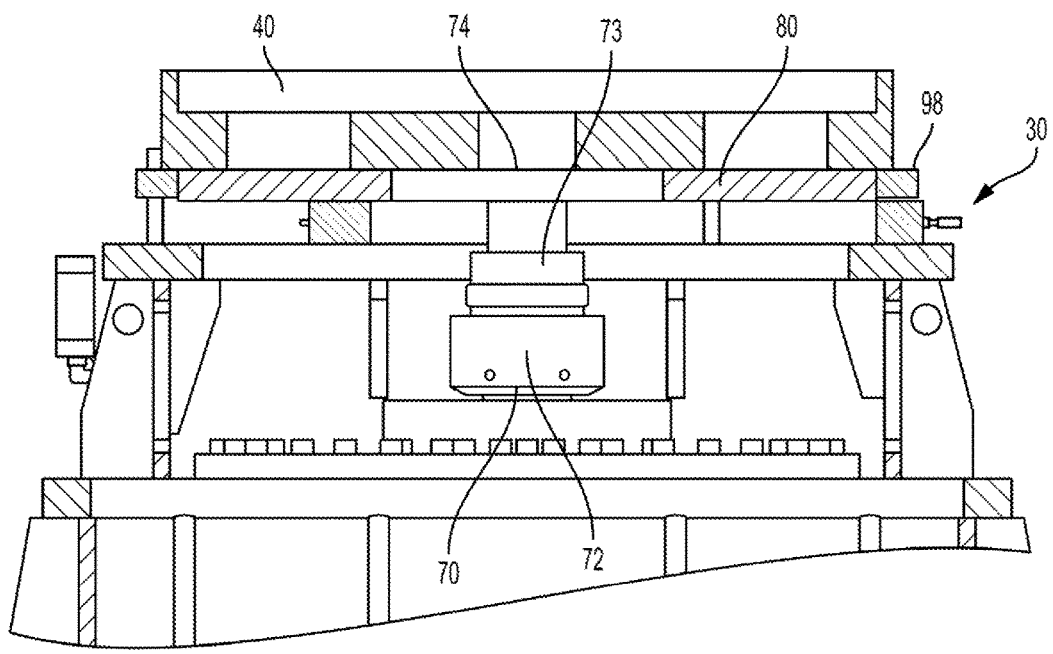
FIG. 30 is a partial side cross-sectional view of the housing with the motor resting on the motor riser blocks and the motor flange holes in register with alignment pins previously installed on the housing in accordance with the process flow of FIG. 26.

FIGS. 26-34 detail an alternate process for installing the motor 40 on the gear box 30. In accordance with the method of FIG. 26-34, the gear box may be prepared for installation of the motor in a manner similar to that previously described. However, in the methods of FIGS. 26-34, the spring feature 112 of the coupling lever 102 is not utilized and thus the spring stud need not be installed and is eliminated from the process. As shown in FIG. 26 (block 26.27) and FIGS. 27-28, the alignment pins 80 may be inserted on the top weldment plate mounting holes 84, and the riser blocks 98 may be installed the top weldment plate 42.

Also, in distinction to the method of FIGS. 2-25, in accordance with the method of FIGS. 26-34, the motor 40 may be lowered on to the riser blocks 98 before the coupling lever 102 and spanner wrench 120 engage the spool coupling 72. Making reference to FIG. 26 (block 26.29-26.30) and FIGS. 29 and 30, the motor 40 may be lowered in to a position where the mounting holes 86 of the motor flange are brought into register with the alignment pins 80. Once the alignment pins 80 are aligned with the motor flange mounting holes 86, the motor 40 may be lowered to a position on top of the riser blocks 98. At this position, the spool coupling 72 will be in a lowered position on the gear train input shaft 70 and spaced from the motor shaft coupling 73.

Figure 31:
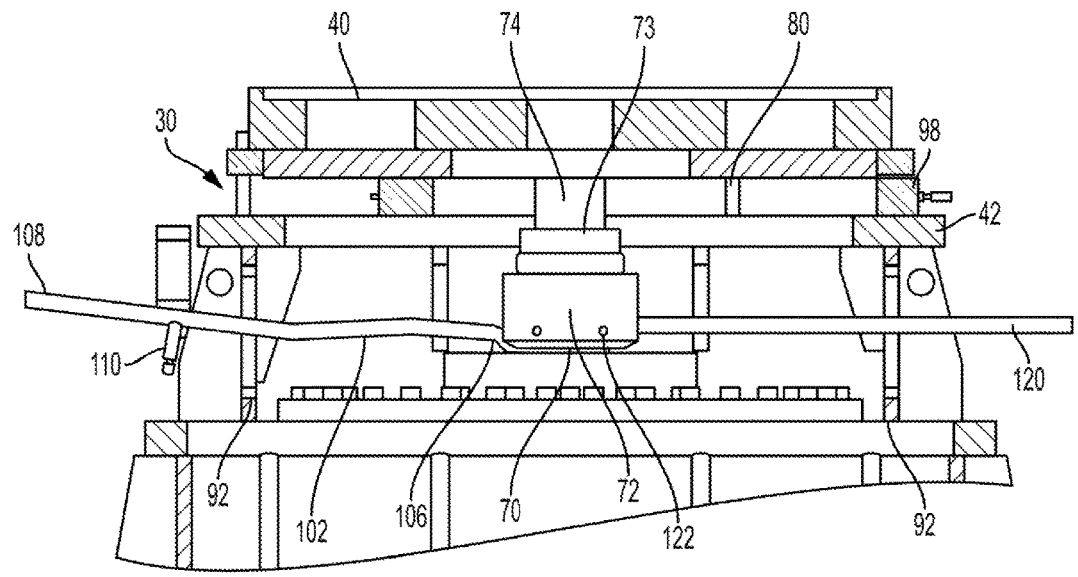
FIG. 31 is a partial side cross-sectional view of the housing showing a coupling lever and spanner wrench being inserted into the housing to engage the spool coupling to rotate the spool coupling in accordance with the process flow of FIG. 26.
Figure 32:
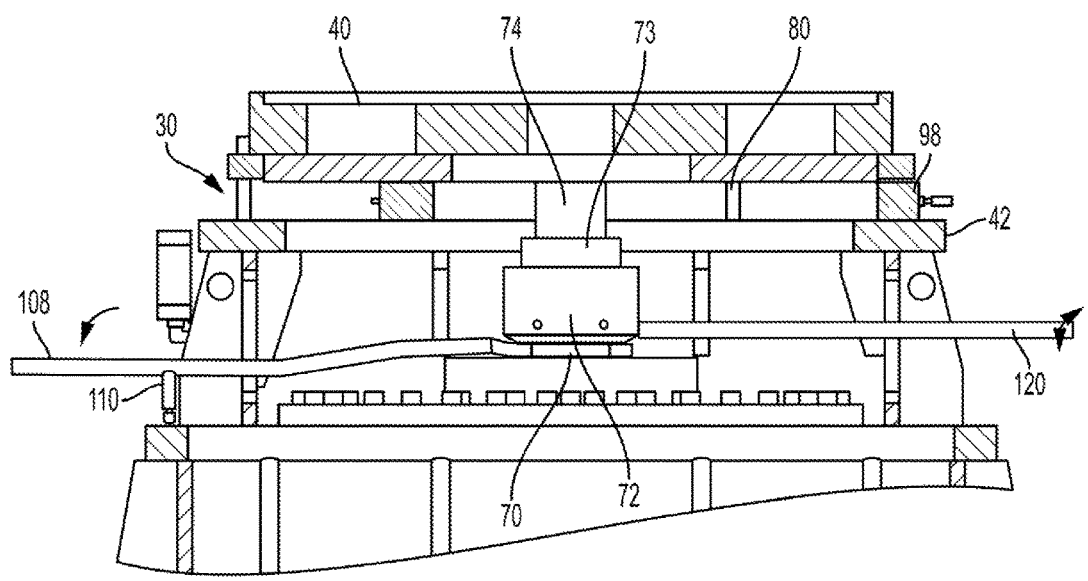
FIG. 32 is a partial side cross-sectional view of the housing showing the coupling lever being rotated downward to urge the spool coupling upward, and the spanner wrench rotating the spool coupling to a position where the spool coupling may be placed in driving engagement with the motor output shaft in accordance with the process flow of FIG. 26.

Making reference to FIG. 26 (block 26.31-26.32) and FIGS. 31-32, with the spool coupling 72 in its lowered position relative to the gear train input shaft 70, the coupling lever 102 may be set up for engagement of the spool coupling. For instance, the stop 110 may have its dimension set so that the coupling lever 102 may be rotated to a position where the spool coupling 72 travels along the gear train input shaft 70 a distance sufficient to allow the spool coupling to maintain engagement with the motor shaft coupling 73 when the motor 40 is raised off the riser blocks during the process to allow removal of the riser blocks. While the drawings show a stop 110 formed integral with the coupling lever, other techniques for ensuring the spool coupling 72 does not travel off the distal end of the gear train input shaft 70 may be utilized, including those described above. Once the dimension of the stop 110 has been set, the coupling lever 102 may be inserted through the access opening 92 of the housing to engage the bottom surface of the spool coupling. The spanner wrench 120 may also be inserted through the access opening 92 opposite the coupling lever 102 to engage the radial holes circumferentially spaced about the spool coupling 72 outer diameter surface. The coupling lever operator end 108 may be rotated downward (counterclockwise in FIG. 32) to raise the coupling bifurcated end 106 upward toward the distal end of the gear train input shaft 70 and against the motor shaft coupling 73. Simultaneously, the spanner wrench 120 may be rotated to move the spool coupling 72 about its center axis so as to bring the spool coupling into driving engagement with the motor shaft coupling 73. For instance, once the spline teeth of the spool coupling and the motor shaft coupling become engaged, the spool coupling will be able to move vertically upward on the gear box input shaft splines and more fully onto the motor shaft coupling splines. As described in reference to FIG. 20, the engagement distance of the spool coupling 72 and the gear train input shaft 70 decreases as the spool coupling slides upward on the gear train input shaft. The engagement distance of the spool coupling 72 and the motor shaft coupling 73 increases as the spool coupling slides upward onto and in driving engagement with the motor shaft coupling. By way of example, the axial length of the splines of the spool coupling may be sized so that approximately one half are engaged by the splines of the motor shaft coupling and the other half are engaged by the splines of the gear box input shaft. The motor riser blocks 98 may be sized based upon the axial length of the splines of the spool coupling to facilitate the spool coupling being rotated with the spanner wrench and being placed in driving engagement with the motor output shaft.

Figure 33:
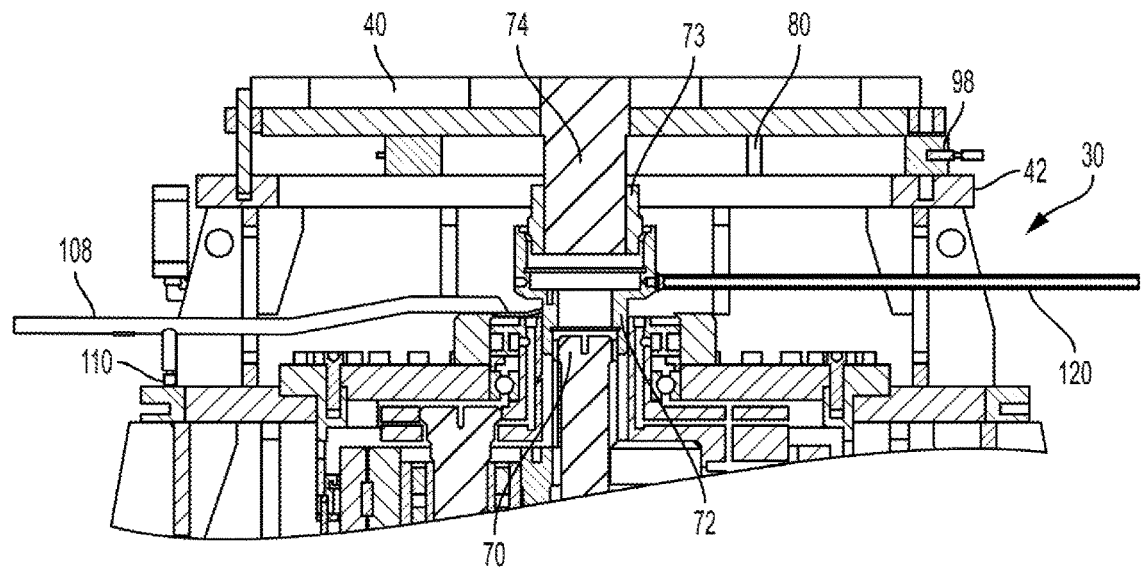
FIG. 33 is a partial side cross-sectional view of the housing showing the motor raised off of the motor riser blocks a distance sufficient to allow removal of the motor riser blocks in accordance with the process flow of FIG. 26.
Figure 34:
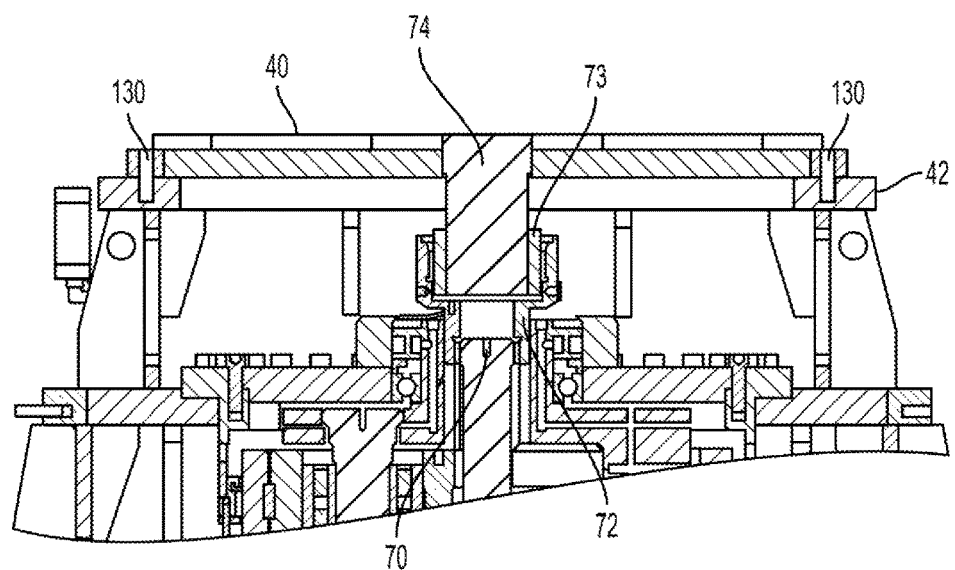
FIG. 34 is a partial cross-sectional view of a side of the housing with the motor mounted on the top weldment plate of the housing in accordance with the process flow of FIG. 26.

Once the spool coupling 72 is in driving engagement with the motor shaft coupling 73, the motor 40 may be lifted off the riser blocks 98 and installation may occur in the manner previously described with respect to FIGS. 22-25. FIGS. 33 and 34 show the final installation of the motor and gear box with the motor being raised off the riser blocks (FIG. 33) and lowered into position (FIG. 34). As described before, with the motor riser blocks 98 removed, the motor 40 may be lowered slowly to maintain proper alignment and engagement of the motor shaft coupling 73 with the spool coupling 72. The engagement distance of the spool coupling 72 and the motor shaft coupling 73 increases as the motor output shaft becomes more fully inserted in the spool coupling. With the motor 40 lowered to its final position with the motor flange abutting the top weldment plate 42, the spool coupling 72 may be in the third alignment position with the spool coupling drivingly engaging the motor output shaft and the gear box input shaft. The coupling lever 102 and the spanner wrench 120 may be removed through the side access openings 92. Once the motor is resting on the gear box top weldment plate, the axial travel of the spool coupling 72 may be checked to ensure the spool coupling is not bound between the end of the motor shaft coupling 73 and the end of the gear box input shaft 70.

In view of the foregoing, it will be seen that the several advantages are achieved and attained. The embodiments were chosen and described in order to best explain practical applications to thereby enable others skilled in the art to best utilize the various embodiments and modifications as are suited to a particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of mounting a motor to a gear box comprising:
    positioning a coupling of an input shaft of the gear box axially along the gear box input shaft from a starting position to a first alignment position on the gear box input shaft, wherein in the starting position, the coupling drivingly engages a greater portion of the gear box input shaft than in the first alignment position, and wherein in the first alignment position, the coupling operatively contacts an output shaft of the motor;
    with the coupling in the first position, rotating the coupling about an axis defined by the gear box input shaft to bring the coupling into alignment with the motor output shaft;
    upon alignment of the coupling with the motor output shaft, positioning the coupling axially along the gear box input shaft at a second alignment position such that the coupling drivingly engages both the motor output shaft and the gear box input shaft; and
    positioning the motor axially relative to the gear box input shaft to allow mounting of the motor on the gear box with the coupling at a third alignment position drivingly engaging a greater portion of both the motor output shaft and the gear box input shaft than in the second alignment position.

2. The method of claim 1 wherein the step of positioning the coupling axially along an input shaft of the gear box from the starting position to the first alignment position includes engaging the coupling with a lever and pivoting the lever to move the coupling from the initial position to the first alignment position.

3. The method of claim 2, wherein the step of pivoting the lever to move the coupling from the initial position to the first alignment position includes pivoting the lever against a stop indicative of the coupling being moved to the first alignment position.

4. The method of claim 3, wherein the step of pivoting the lever against the stop indicative of the coupling being moved to the first alignment includes selecting a dimension of the stop corresponding to the first alignment position.

5. The method of claim 2, wherein the step of engaging the coupling with the lever includes placing a bifurcated end of the lever around the gear box input shaft with bifurcations of the bifurcated end engaging the coupling.

6. The method of claim 1, further comprising supporting the motor on a support before positioning the coupling axially along the gear box input shaft.

7. The method of claim 6, wherein the step of positioning the coupling axially along the gear box input shaft includes moving the coupling into operative contact with the motor shaft.

8. The method of claim 1 wherein the step of positioning the coupling axially along the input shaft of the gear box from the starting position to the first alignment position includes moving the coupling axially along splines of the gear box input shaft.

9. The method of claim 1, wherein the step of positioning the coupling axially along the gear box input shaft at the second alignment position such that the coupling drivingly engages both the motor output shaft and the gear box input shaft includes moving the coupling axially along splines of both the gear box input shaft and splines arranged at a distal end of the motor output shaft.

10. The method of claim 1 wherein the step of positioning the coupling axially along an input shaft of the gear box from the starting position to the first alignment position includes biasing the coupling toward the first alignment position.

11. The method of claim 1, further comprising installing alignment rods on one of the gear box and the motor and aligning the motor with the gear box with the alignment rods.

12. The method of claim 1, further comprising positioning the motor vertically above the gear box.

13. A method of mounting a motor on a gear box comprising:
    moving a spool coupling axially along an input shaft of the gear box toward a distal end of the input shaft with the spool coupling in driving engagement with the gear box input shaft;
    rotating the spool coupling to bring the coupling into alignment with an output shaft of the motor;
    upon alignment of the coupling with the motor output shaft, moving the spool coupling axially along the input shaft of the gear box such that the spool coupling is in driving engagement with both the output shaft of the motor and the gear box input shaft; and
    moving the motor axially relative to the gear box input shaft to a final position where the motor is mountable to the gear box.

14. The method of claim 13 wherein the step of moving the spool coupling axially along the input shaft of the gear box toward the distal end of the input shaft with the spool coupling in driving engagement with the gear box input shaft includes engaging the spool coupling with a lever and pivoting the lever to move the spool coupling toward the distal end of the gear box input shaft.

15. The method of claim 14, wherein the step of pivoting the lever to move the coupling toward the distal end of the gear box input shaft includes pivoting the lever against a stop indicative of the coupling being moved to a position to operatively contact the motor output shaft.

16. The method of claim 15, wherein the step of pivoting the lever against the stop indicative of the coupling being moved to the position to contact the motor output shaft includes selecting a dimension of the stop corresponding to the position of the coupling operatively contacting the motor output shaft.

17. The method of claim 14, wherein the step of positioning the coupling axially along an input shaft of the gear box toward the distal end of the gear box input shaft includes biasing the lever to drive the coupling toward the distal end of the gear box input shaft.

18. The method of claim 17, wherein the step of biasing the lever to drive the coupling toward the distal end of the gear box input shaft includes extending a spring between a distal end of the lever and the gear box.

19. The method of claim 14, wherein the step of engaging the coupling with the lever includes placing a bifurcated end of the lever around the gear box input shaft with bifurcations of the bifurcated end engaging the coupling.

20. The method of claim 13, further comprising installing alignment rods on one of the gear box and the motor and aligning the motor with the gear box with the alignment rods.

21. The method of claim 20, wherein the step of aligning the motor with the gear box with the alignment rods includes directing the alignment rods through gear box mounting holes of the motor.

22. The method of claim 13, further comprising supporting the motor on a support before moving the coupling axially along the gear box input shaft.

23. The method of claim 22, wherein the step of moving the coupling axially along the gear box input shaft includes moving the coupling into operative contact with the motor shaft.

24. The method of claim 13, wherein the step of moving the coupling axially along the input shaft of the gear box toward the distal end of the gear box input shaft includes moving the coupling axially along splines of the gear box input shaft.

25. The method of claim 13, wherein the step of moving the coupling axially along the gear box input shaft such that the spool coupling is in driving engagement with both the output shaft of the motor and the gear box input shaft includes moving the coupling axially along splines of the gear box input shaft and splines arranged at a distal end of the motor output shaft.

26. The method of claim 13, further comprising arranging the motor vertically above the gear box.

* * * * *